(12) United States Patent
Curtis

(10) Patent No.: US 8,682,984 B2
(45) Date of Patent: Mar. 25, 2014

(54) METHOD AND APPARATUS FOR TRANSFERRING CONTENT TO A NUMBER OF RECIPIENTS VIA MULTIPLE INDEPENDENT COMMUNICATION MEDIUMS

(75) Inventor: Timothy Stuart Curtis, New South Wales (AU)

(73) Assignee: Vertical Business Solutions Pty Ltd, Wollongong (AU)

( * ) Notice: Subject to any disclaimer, the term of this patent is extended or adjusted under 35 U.S.C. 154(b) by 320 days.

(21) Appl. No.: 11/950,968

(22) Filed: Dec. 5, 2007

(65) Prior Publication Data
US 2008/0147812 A1    Jun. 19, 2008

(30) Foreign Application Priority Data
Dec. 6, 2006  (AU) ................................ 2006906824

(51) Int. Cl.
*G06F 15/16*  (2006.01)

(52) U.S. Cl.
USPC ............................. 709/206; 709/204; 709/207

(58) Field of Classification Search
USPC ........................................................ 709/206
See application file for complete search history.

(56) References Cited

U.S. PATENT DOCUMENTS

| | | | |
|---|---|---|---|
| 6,327,248 B1 * | 12/2001 | Hosokawa et al. ........... | 370/235 |
| 2003/0140097 A1 * | 7/2003 | Schloer ......................... | 709/203 |
| 2004/0131190 A1 * | 7/2004 | Nobel et al. .................. | 380/282 |
| 2007/0005694 A1 * | 1/2007 | Popkin et al. ................ | 709/204 |
| 2007/0042727 A1 * | 2/2007 | Stefani ......................... | 455/121 |
| 2008/0019284 A1 * | 1/2008 | John et al. .................... | 370/254 |
| 2008/0091845 A1 * | 4/2008 | Mills et al. ................... | 709/246 |

* cited by examiner

*Primary Examiner* — Shripal Khajuria
(74) *Attorney, Agent, or Firm* — Brown Rudnick LLP

(57) ABSTRACT

A method of transferring content via multiple communications mediums. The method includes, in a processing system, and for each of a number of recipients, selecting at least one available communications medium and transferring content to each recipient using the selected at least one available communications medium.

27 Claims, 25 Drawing Sheets

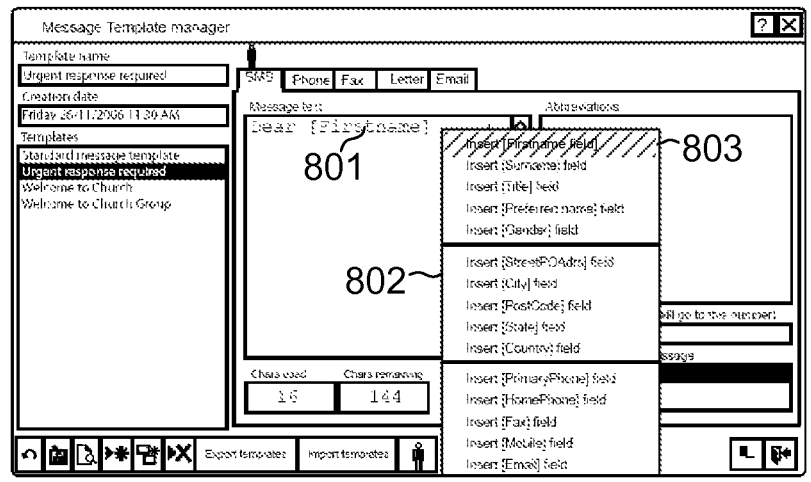
Fig. 8A
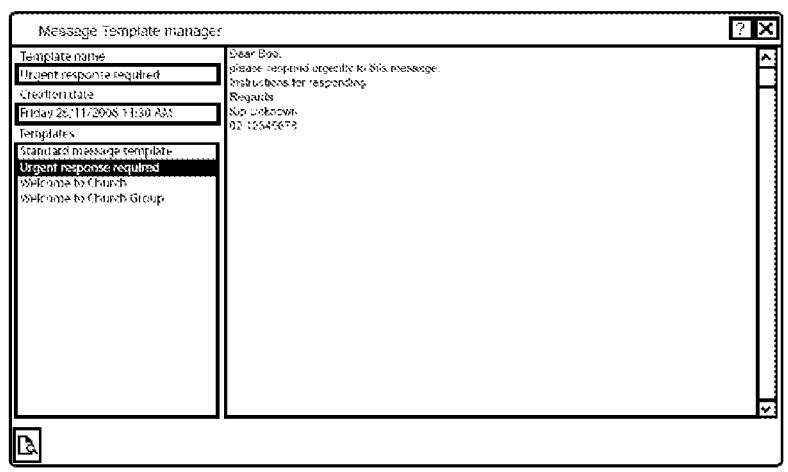
Fig. 8B
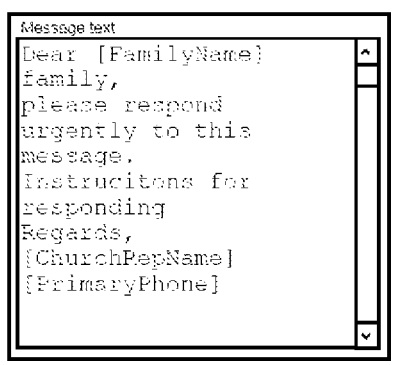 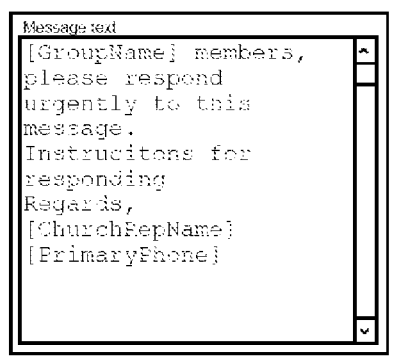
Fig. 8C        Fig. 8D

Fig. 24

METHOD AND APPARATUS FOR TRANSFERRING CONTENT TO A NUMBER OF RECIPIENTS VIA MULTIPLE INDEPENDENT COMMUNICATION MEDIUMS

CROSS-REFERENCE TO RELATED CASE

This claims priority to and the benefit of Australia Patent Application No. 2006906824 filed on Dec. 6, 2006.

BACKGROUND OF THE INVENTION

The present invention relates to a method and apparatus for communicating via a number of different communications mediums, and in particular to a method and apparatus for messaging a number of recipients via a number of different communications mediums.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Currently, when it is desired to send content to recipients, this is typically performed by having a user select a mechanism for providing the content, and then create and send the content using an appropriate software application or other delivery mechanism. Thus, for example, if a user is required to send an e-mail, this may require the use of e-mail applications software, or a webmail system, whilst the sending of a fax typically requires a fax server, or dedicated fax machine. However, this suffers from a number of disadvantages.

For example, communications mechanisms may become unavailable, in which case attempts to send the content to recipients via that mechanism may fail. Thus, for example, when a fax machine runs out of paper, it is no longer possible for the user to receive fax communications, in which case, it may not be possible to deliver content to the intended recipient.

Additional problems are encountered when it is desired to transfer content to a number of different users simultaneously. For example, whilst this may be achievable for a given communications medium relatively easily, such as e-mail, where an e-mail can be sent directly to a number of recipients, this is not possible with all communications mechanisms. Even when a number of recipients can be defined simultaneously, typically identical content is sent to each recipient, which is not always appropriate, for example, if it is desired to send individualised content.

Furthermore, some users may only be able to receive content via a first communications mechanism, whilst others can only receive content via a second different communications medium. In this instance, if a user is trying to forward content to multiple individuals, this can become complex and require the user to coordinate a number of different mechanisms to allow content to be transferred to each of the recipients.

SUMMARY OF THE PRESENT INVENTION

In a first broad form the present invention provides a method of transferring content via multiple communications mediums, the method including, in a processing system:

a) for each of a number of recipients, selecting at least one available communications medium; and,
b) transferring content to each recipient using the selected at least one available communications medium.

Typically the method includes, in the processing system, selecting the number of recipients from a plurality of recipients.

Typically the method includes, in the processing system, at least one of:
a) selecting recipients from a list of available contactees;
b) selecting recipients in accordance with a recipient type; and,
c) selecting recipients by performing a search using recipient attributes.

Typically the recipient type includes at least one of:
a) individual;
b) family;
c) group; and,
d) organisation.

Typically the method includes, in the processing system:
a) determining available communications mediums; and,
b) for each recipient, selecting at least one of the available communications mediums.

Typically the method includes, in the processing system:
a) determining contact details for each recipient; and,
b) selecting at least one of the available communications mediums using the contact details.

Typically the method includes, in the processing system:
a) determining a priority associated with each medium; and,
b) in accordance with the priorities, at least one of:
   i) transferring content; and,
   ii) selecting the at least one available communications medium.

Typically the method includes, in the processing system, determining the content.

Typically the method includes, in the processing system, determining respective content for each communications medium.

Typically the method includes, in the processing system:
a) determining master content; and,
b) determining the respective content using the master content.

Typically the method includes, in the processing system, determining content at least partially in accordance with the communications medium used to transfer the content.

Typically the method includes, in the processing system:
a) determining common content; and,
b) determining respective content for each communications medium using the common content.

Typically the master content includes at least one placeholder, and wherein the method includes, in the processing system, replacing the placeholder with a value.

Typically the method includes, in the processing system, selecting the value based on at least one of:
a) the communications medium to be used to send the content;
b) at least one recipient attribute; and,
c) at least one recipient type.

Typically the method includes, in the processing system, selecting a value for each recipient such that respective content is sent to each recipient.

Typically the method includes, in the processing system:
a) replacing the placeholder with sample values; and,
b) selectively updating the sample values with alternative values in response to user inputs.

Typically the method includes, in the processing system, transferring content by at least one of:
  a) transferring at least some content to at least one recipient device via a communications network.
  b) transferring at least some content to a base station, the base station being responsive to the content at least one recipient device via a communications network;
  c) transferring at least some of the content to a communications device, the communications device being responsive to the content to cause the content to be provided to at least one recipient; and,
  d) transferring at least some of the content to applications software, the applications software being responsive to the content to cause the content to be provided to at least one recipient.

Typically the method includes, in the processing system, transferring content by displaying instructions for content transfer, an operator being responsive to the instructions to transfer the content.

Typically the operator causes the content to be transferred via a telephone call.

Typically the method includes, in the processing system, causing an interface to be displayed, the interface including an indication of:
  a) available communications mediums; and,
  b) recipients.

Typically the method includes, in the processing system, determining user selection of at least one of recipients and communications mediums via the interface.

Typically the method includes, in the processing system:
  a) receiving input commands from a user; and,
  b) using the input commands, at least one of:
     i) determining content;
     ii) selecting recipients;
     iii) selecting communications mediums.

Typically the method includes, in the processing system:
  a) determining a status associated with content transfer; and,
  b) at least one of:
     i) storing an indication of the status; and,
     ii) displaying an indication of the status.

Typically the content is a message, and wherein the communications mediums include at least one of:
  a) Phone;
  b) fax;
  c) e-mail;
  d) letter; and,
  e) SMS.
  f) Voice and video messaging,
  g) MMS (multi-media messaging)
  h) Instant Messaging Typically the method includes, in the processing system:
  a) for each of a number of recipients, selecting a plurality of available communications mediums; and,
  b) transferring content to each recipient using at least one of the selected available communications mediums.

Typically the method includes, in the processing system:
  a) for each recipient, determining a priority associated with each selected available communication medium; and,
  b) transferring content to each recipient using the selected available communications mediums in accordance with the priorities.

Typically the method includes, in the processing system:
  a) for each recipient, attempting to transfer content to the recipient using the selected available communications medium having the highest priority;
  b) in the event of a failed transmission, attempting to transfer content to the recipient using the selected available communications medium having the next highest priority; and,
  c) repeating step b) until the content is transferred.

In a second broad form the present invention provides apparatus for transferring content via multiple communications mediums, the apparatus including a processing system for:
  a) for each of a number of recipients, selecting at least one available communications medium; and,
  b) transferring content to each recipient using the selected at least one available communications medium.

Typically the apparatus includes, at least one of:
  a) a fax for sending fax messages;
  b) a phone for at least one of:
     i) sending SMS messages;
     ii) allowing phone calls to be made;
  c) a printer for printing messages.

Typically the processing system is connected to a communications network for allowing transfer of messages.

In a third broad form the present invention provides a method of transferring content via multiple communications mediums, the method including, in a processing system:
  a) causing a user interface to be displayed, the user interface indicating at least a plurality of available communications mediums;
  b) receiving input commands from the user;
  c) using the input commands to determine:
     i) a number of recipients;
     ii) at least one selected available communications medium for each recipient; and,
  d) transferring the content to each recipient using the selected at least one available communications medium.

Typically the method includes, in the processing system:
  a) determining, using the input commands, at least one recipient;
  b) determining, for the at least one recipient, any available communications mediums; and,
  c) updating the user interface to display an indication of the at least one recipient and any available communications mediums, thereby allowing the user to provide input commands representing the selection of at least one of the available communications mediums for the at least one recipient.

Typically the method includes, in the processing system:
  a) determining contact details for the at least one recipient; and,
  b) determining the available communications mediums using the contact details.

Typically the method includes, in the processing system, displaying an indication of the content to be transferred using the interface.

Typically the method includes, in the processing system:
  a) determining the content using the input commands; and,
  b) updating the user interface to display an indication of the content.

Typically the method includes, in the processing system, determining respective content for each of the available communications mediums.

Typically the method includes, in the processing system:
  a) determining a content transfer status for at least one recipient and at least one communications medium; and,
  b) updating the user interface to display an indication of the content transfer status.

Typically the method includes, in the processing system transferring the content by at least one of:
a) transferring at least some content to at least one recipient device via a communications network.
b) transferring at least some content to a base station, the base station being responsive to the content at least one recipient device via a communications network;
c) transferring at least some of the content to a communications device, the communications device being responsive to the content to cause the content to be provided to at least one recipient; and,
d) transferring at least some of the content to applications software, the applications software being responsive to the content to cause the content to be provided to at least one recipient.

Typically the method includes, in the processing system, transferring content by displaying instructions for content transfer, an operator being responsive to the instructions to transfer the content.

In a fourth broad form the present invention provides apparatus for transferring content via multiple communications mediums, the apparatus including a processing system for:
a) causing a user interface to be displayed, the user interface indicating at least a plurality of available communications mediums;
b) receiving input commands from the user;
c) using the input commands to determine:
 i) a number of recipients;
 ii) at least one selected available communications medium for each recipient; and,
d) transferring the content to each recipient using the selected at least one available communications medium.

BRIEF DESCRIPTION OF THE DRAWINGS

An example of the present invention will now be described with reference to the accompanying drawings, in which:—

FIGS. 8A to 8D are screen shots of an example of the use of placeholders;

FIG. 24 is screen shots of an example of an interface used to set search criteria, search and retrieve and view previously created messages;

DETAILED DESCRIPTION OF THE PREFERRED EMBODIMENTS

Figure 1:
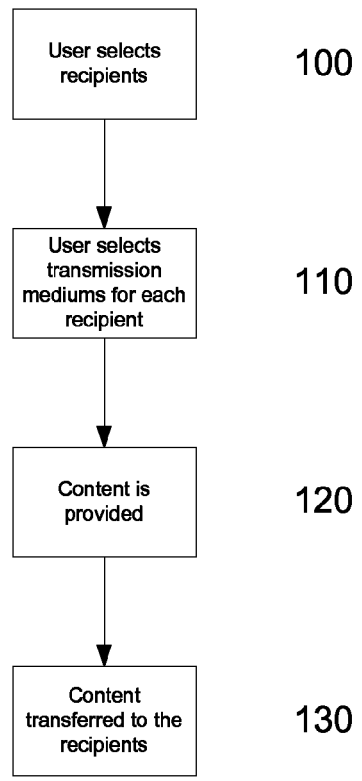
FIG. 1 is a flow chart of an example of the process of transferring content to recipients using multiple mediums.

An example of a process for transferring content via multiple communications mediums will now be described with reference to FIG. 1.

In this example, at step 100 a user selects recipients. The recipients are any individuals, groups or entities that are to receive at least some of the content. The recipients may be selected in any one of a number of ways depending upon the preferred implementation. Thus, in one example, the process is performed at least in part utilising a computer system, which can display a list of available recipients, allowing the user to select recipients from the list. Additionally, or alternatively the user can provide contact details for recipients for example by providing a phone number, fax number or the like.

At step 110 the user selects one or more transmission mediums. Again, the transmission mediums can be selected in any one of a number of manners. For example this may be achieved utilising a list of available transmission mediums displayed by a computer system. Whilst the selected communications mediums can be used for all of the recipients, alternatively, different communications mediums may be selected for different recipients. It will be appreciated this may be required for example if some transmission mediums are not available for some recipients or users, in which case the selection can be limited to the available transmission mediums.

The nature of the transmission mediums available may also depend on the nature of the content. For example, if the content is a message, the transmission mediums can include, fax, e-mail, SMS (Short Message Service) messages, letters, phone calls including VOIP (Voice Over IP), landline, mobile, or the like.

At step 120, content is provided. This may be achieved in any one of a number of manners, and may involve the user generating the content, for example, by authoring a message using suitable applications software provided on a computer system, using pre-generated content, for example retrieved from a store, or a combination of the two. Alternatively, any suitable technique may be used. It will be appreciated that this may involve the use of third party software, seed as word processing software or the like or custom applications software as will be described in more detail below.

At step 130 the content is transferred to the recipient via the selected transmission mediums. This again may be performed in any one of a number of ways, but typically involves having the computer system determine the recipients for each transmission medium, and then forward the content accordingly.

For example, if the content is in the form of a message the computer system may be required to implement software applications, for example to allow the message to be sent as an e-mail or fax. The computer system may interact with appropriate hardware, for example to allow printing of letters or sending of an SMS (short message service) message. The computer system may communicate with a remote server or other similar device, which acts as a service provider allowing the content to be transferred on behalf of the user. A further alternative is for the computer system to allow the message to be communicated by phone. This may require that the computer system generate instructions for an operative, or interact with a phone to allow automated call control and optionally to provide speech recognition and generation.

In the case of sending letters, letters would typically need to be delivered using some other means such as printing, placing in an envelope and/or folding to create an envelope, and mailing at post office/post box. This may be performed by having the computer system print the letter and/or envelope, allowing the letter to be sent by an operator. Alternatively, the letter may be forwarded electronically to a third party, allowing the third party to send the letter on the operator's behalf.

Figure 2:
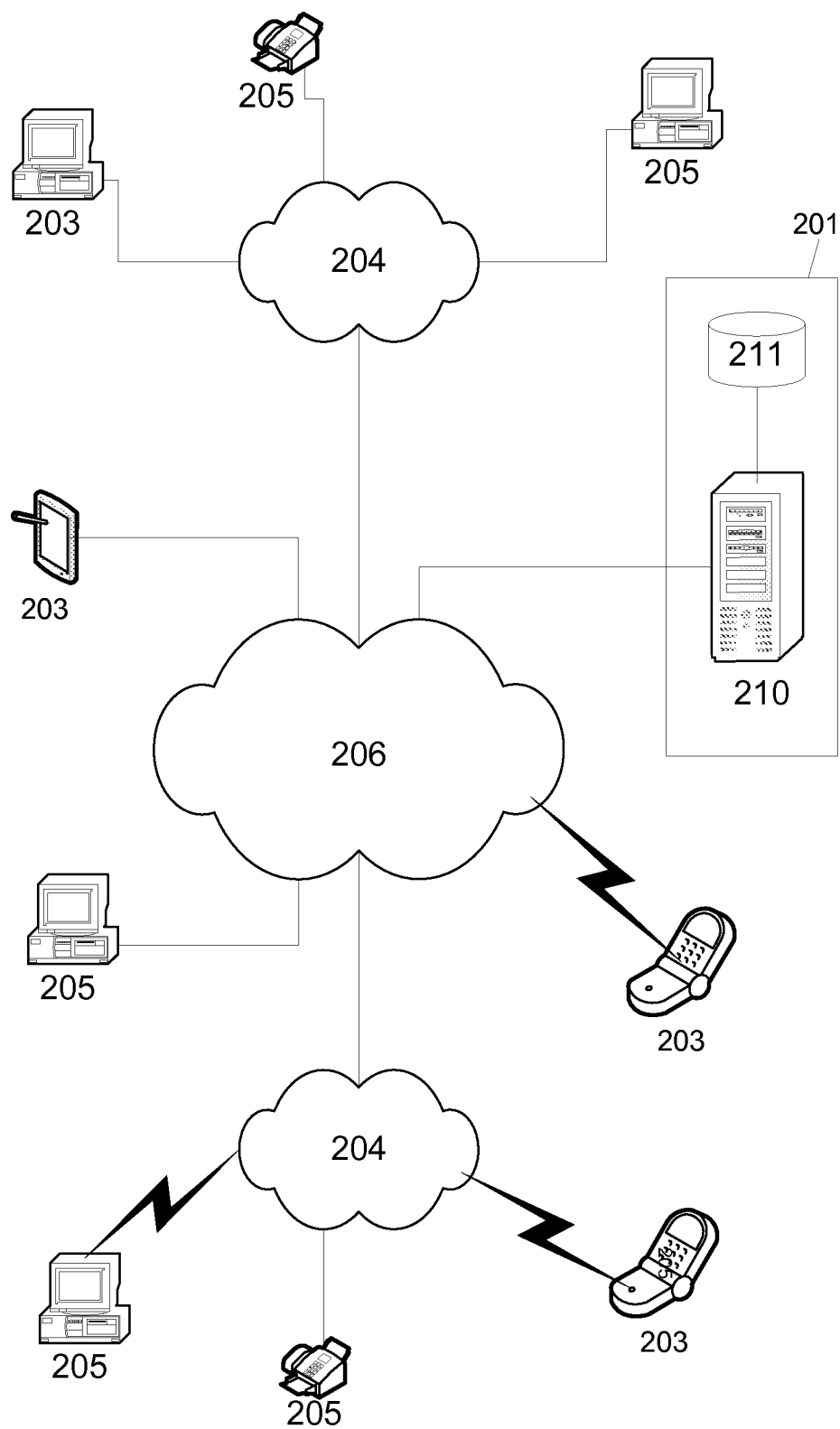
FIG. 2 is a schematic diagram of an example of a system for sending content to recipients using multiple mediums.

This process is typically performed using a suitable hardware system an example of which will now be described with reference to FIG. 2.

In this example, a user computer system 203 is coupled to one or more recipient devices 205 via one or more communications networks 204, 206. The communications networks 204, 206 may be of any suitable form, such as local area networks (LANs), wide area networks (WANs), the Internet, a public switched telephone network (PSTN), or the like.

A base station 201 may also be provided. The base station 201 typically includes one or more processing systems 210, optionally coupled to one or more databases 211. In use, the processing system 210 can be adapted to perform various communication tasks on behalf of the user, as well as optionally providing access to stored data, web pages, or the like.

Figure 3:
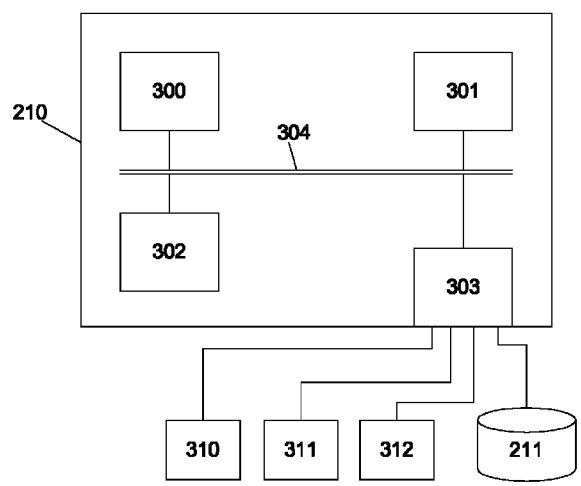
FIG. 3 is a schematic diagram of an example of a processing system.

Any form of suitable processing system 210 may be used, and an example is shown in FIG. 3. In this example, the processing system 210 includes at least a processor 300, a memory 301, an input/output (I/O) device 302, such as a keyboard, and display, and an external interface 303, coupled together via a bus 304 as shown.

Accordingly, it will be appreciated that the processing system 210 may be formed from any suitable processing system, such as a suitably programmed PC, Internet terminal, lap-top, hand-held PC, or the like.

Additionally, the base station 201 may be coupled to communications devices such as a printer 310 or fax machine 311, phone device 312, or the like. This can be used to allow content such as letters, faxes, SMS messages, or phone calls, to be sent or made on a user's behalf. This process may be performed automatically, for example in the case of faxes, SMSs, or the like, or may require manual intervention in the case of phone calls, or letters in which case suitable operatives may be provided at the base station 201 or another suitable location. In these latter cases, the operative may be provided with a script for making phone calls, or a letter in electronic form for printing and subsequent postal.

The processing system 210 may operate applications software to enable data transfer and in some cases web-hosting and file transfer protocol (FTP) functionality. This may require that the processing system 210 is a network server connected via a high-bandwidth connection to the Internet.

In use, the computer systems 203 are adapted to communicate with recipients either directly, or via recipient devices 205 and/or via the base station 201. It will be appreciated that this allows a number of different forms of computer system 203 to be used.

Figure 4:
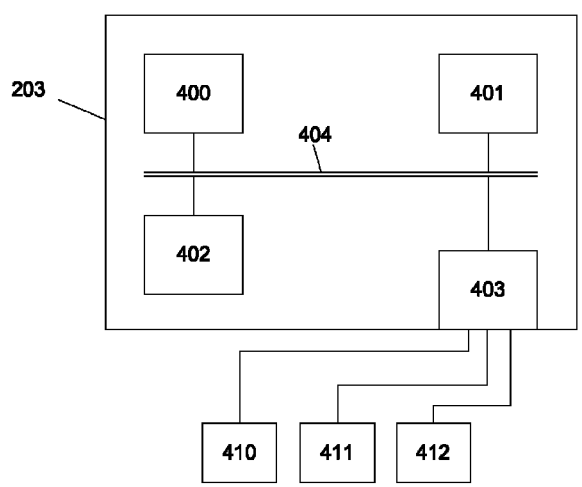
FIG. 4 is a schematic diagram of an example of an computer system.

An example of a suitable computer system 203 is shown in FIG. 4. As shown the computer system 203 includes a processor 400, a memory 401, an input/output device 402 such as a keyboard and display, and an external interface 403 coupled together via a bus 404, as shown. The internal interface 405 is typically provided to allow the computer system 203 to be coupled to one of the communications networks 204, 206, and accordingly, this may be in the form of a network interface card, or the like.

In use, the processor 400 is adapted to communicate with the processing system 210 provided in the base station 201 via the communications networks 204, 206 to allow communication with the recipient devices 205 or the base station 201. Additionally, the computer system 203 may be coupled to communications devices such as a printer 410, fax machine 411, phone device 412, or the like.

Accordingly, it will be appreciated that the computer systems 203 may be formed from any suitable processing system, such as a suitably programmed PC, Internet terminal, lap-top, hand-held PC, smart phone, PDA, web server, or the like, which is typically operating applications software to enable the process to be implemented. This may therefore require applications software for enabling content creation or management, as well as applications software for content transfer and in some cases web-browsing and optionally for allowing communications with third parties.

It will be appreciated that the recipient devices 205 may take on any one of a number of forms. For example, the recipient devices 205 could be formed from a computer system, similar to the computer system 203, a printer 310, fax machine 311, phone device 312, or the like, or any combination of the above.

Figure 5A:
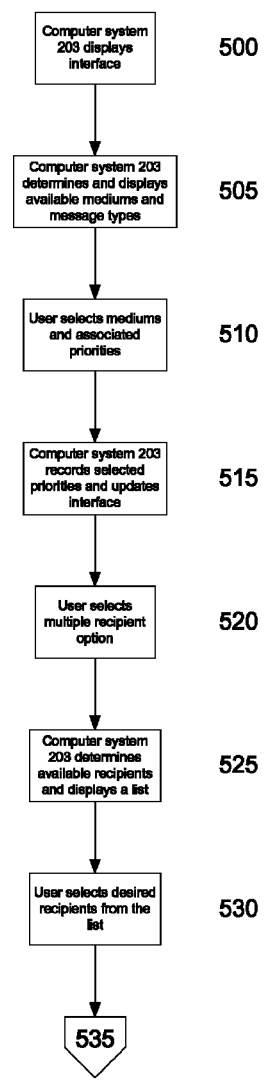
FIG. 5 is a flow chart of an example of the process of generating a message.
Figure 5B:
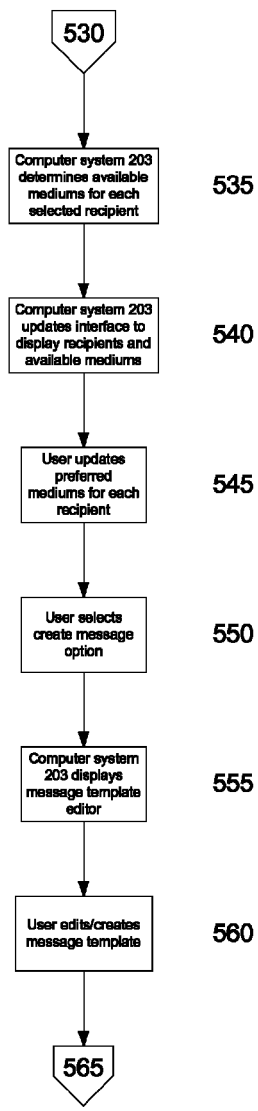
Figure 5C:
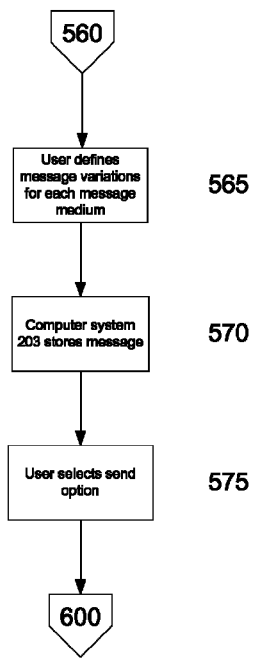
Figure 6:
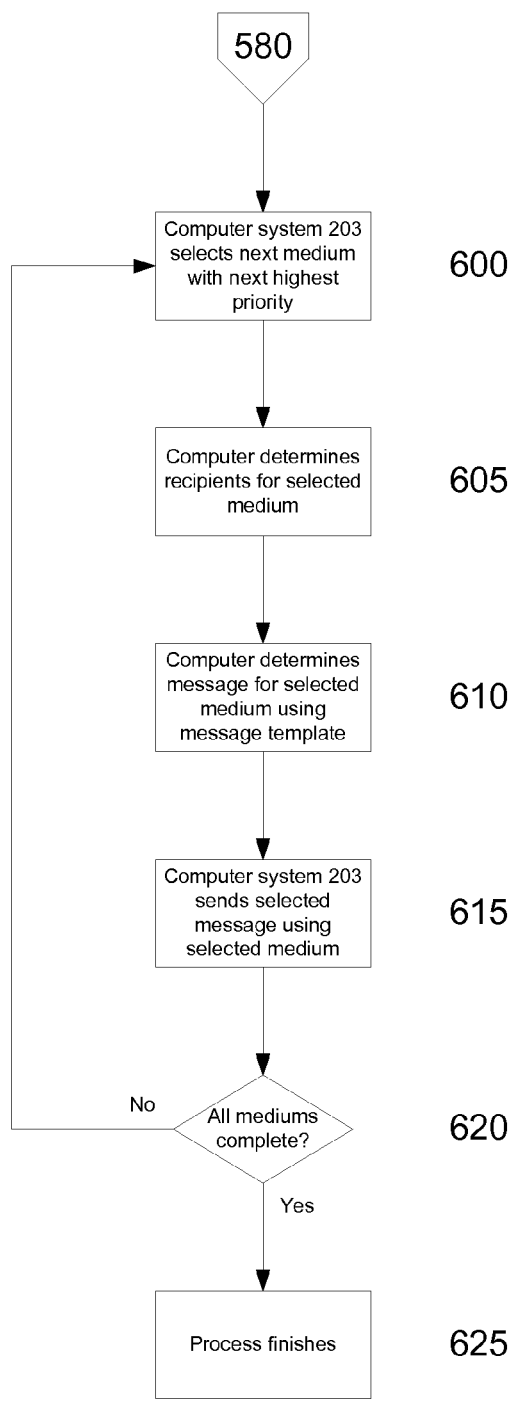
FIG. 6 is a flow chart of an example of the process of sending a message.

An example of the process will now be described in further detail with respect to FIGS. 5 and 6. For the purpose of this example, the content to be transferred is a message that is to be sent to a number of recipients via a number of different communications mediums, including phone, fax, e-mail, SMS, and letter. For the purpose of this example, it is assumed that the multiple messages are to be sent to multiple recipients and that this is achieved by having the user select an appropriate multi-medium message option. This will not therefore be described in any further detail.

For the purpose of this example, the computer software 203 implements applications software to manage recipients, select and control the communications mediums and to allow the message to be created. However, it will be appreciated that alternatively a number of different software applications may be required for performing different tasks. Additionally, some or all of the process could be implemented using applications software hosted by the base station 201, with the computer system 203 being used to control the process via a suitable interface, such as a web-page, or the like.

At step 500, the computer system 203 displays a user interface hereinafter referred to as a "message centre". An example of a message centre is shown in FIG. 7.

In this example, the user interface is a custom interface generated using custom applications software executed by the computer system 203. However, this is for the purpose of example only, and it will be appreciated that any suitable interface may be used that provides the described functionality. Thus, for example, the user interface could be generated completely or in part using custom applications software, third party applications, or a combination of the two. Additionally, or alternatively, the user interface could also be generated remotely and displayed using the computer system 203, for example, by having the user interface generated as a web-page by the base station 201 and displayed to the user on the computer system 203 using a suitable browser application.

In this example, the message centre includes a number of controls that can be operated using a suitable input device such as a mouse or keyboard to provide a number of features. Examples of the controls are given below, although provision of each of these controls is not essential, as will become apparent from the description below:

Tab page labels 701. These enable moving between a start page (task navigation), a view messages page (viewing and printing lists of previously created messages meeting selection criteria), a select messages page (setting message selection criteria) and a message details page (create, edit and view messages).

Message medium column headers 702 are used to indicate the message medium of the column.

Check boxes 703 enable the selection of message mediums for specific recipients. Surrounding colours can be used to indicate the status of the message medium according to the following legend; Red—error sending, Blue—medium unavailable, Green—sent, No colour—unsent and no attempt to send has been made, Purple—message sent and reply received, Yellow—message sent but success or failure not yet confirmed. Colours can be customised by the user.

Representative dropdown control 704. This enables the selection of a sender (which in this example is a Church representative) by clicking on the small down arrow at the right of the control and then selecting from the resulting list. Alternatively the control can be typed into directly until the required match is achieved.

Representative type controls 705. This enables the selection of Recipient types, such as individual, family, group or organisation types, although it will be appreciated that any suitable recipient type may be used depending on the preferred implementation.

Edit message content button 706. Opens a Message content form, in Edit Message mode, to enable editing the message content of the currently selected recipient.

Edit master message content button 707. Opens a Message Editor in master message mode, to enable editing the master message content. Master message content is used to generate the individualised message content for each message medium of each recipient.

Add recipient buttons 708. Allows a user to add an individual, all members of a family or members of a group to a list of contactees. In addition recipients can be selected and added by setting filter criteria using the command button 708*b*. Criteria can be set on a wide variety of properties including age, gender, membership in specific groups etc. Recipients of type individual, family, group or organisation can be added in this manner.

Display recipient button 709. Allows toggling between displaying a single recipient, (FIG. 7A) three recipients (FIG. 7B) and multiple recipients. In one example, displaying more recipients may reduce the amount of detail about other aspects of the master message that is visible.

Send button 710. Sends the complete message ie all selected message mediums for all recipients.

Options button 711. Enables setting of preferences for communications related options eg user name, account number for text messaging service.

Close button 712. Closes the Message Centre form.

Contactee dropdown control 713. Enables the selection of the Recipient by clicking on the small down arrow at the right of the control and then selecting from the resulting list. Alternatively the control can be typed into directly until the required match is achieved. The Recipient can be of one of the following Recipient types; individual, family, group or organisation.

Contactee type controls 714. Enable the selection of the Recipient type (individual, family, group or organisation).

Recipient message status 715. Displays the status of the Recipient Message eg sent, partially sent, outbox etc Message medium priority controls 716. For setting message medium priorities including setting to nothing (un-selecting).

Message medium selector 717. Enables selection of message mediums to be used in a multi-medium message. [Ctrl] and [Shift] keys can be used to, respectively, select multiple, separate mediums or a range of message mediums.

Multiple recipients option 718. Enables multiple recipients to be selected.

Type listbox 719. Displays available message types e.g. fax, email, multi-medium.

Delete recipient button 720. Allows recipients to be removed.

As part of this process, at step 505, the computer system 203 determines and displays an indication of available message mediums and corresponding message types, in the type listbox 719. It will be appreciated by persons skilled in the art that the available message types displayed in the type listbox 719 and the available mediums displayed in the Message medium selector 717 will depend on a number of factors, such as the communications interfaces or devices present in the computer system 203, as well as the status of the computer system's connection to the communications networks 204, 206, and the base station 201.

Thus, for example, if the computer system 203 does not have fax capabilities, and the connection to the base station 201 is inactive, it may not be possible to send a fax, and this medium will therefore be determined to be unavailable. In the event that a fax medium is unavailable, then in general, a fax message type is also unavailable. In one example, this medium may be indicated as unavailable, and hence cannot be selected, or it may be marked as temporarily unavailable, in which case, it can be selected, but the message would not be sent until the connection to the base station 201 is restored.

For real-time communications mediums, if there is a method of detecting availability of the recipient, for example by using available via $3^{rd}$ party software/systems, prior to attempting to communicate/send a message, then this can be incorporated into the process of determining which communications methods to use and updating the display. This enables the user to see which of the selected real-time communications mediums would have the greater chance of success for each separate recipient.

At step 510, the user then selects the mediums to be used, causing these to be added to the medium selector 717, allowing the user to assign associated priorities, using the message medium priority. The priority is used to control which message mediums are selected for each specific recipient, as will be described in more detail below. Alternatively however, this could be used to control the order in which messages are sent, or the like.

The computer system 203 records the selected priorities and updates the message centre interface at step 515. Thus, at this stage the user will have a designated available communications medium and indicated for each one the priority that is to be given to that respective medium.

Instead of manually selecting mediums and priorities, the user could be given the option of selecting from a range of communication 'schemes'. These schemes could include, for example:

Use all available methods,
Use all real-time methods,
Use first available real-time method,
Use all non-real-time methods,
Use first available non-real-time method,
Use lowest cost communications,
Use first available nil-cost method, The system can then select mediums and priorities based on the selected scheme. The user would be able to override default selections of mediums and priorities if required. The advantage of schemes is the increased convenience and reduction in skill required to operate the system. For some people selecting mediums and priorities may be a little confusing, whereas selecting a communication scheme may be easier to understand and quicker to select.

At step 520 the user selects a multiple recipient option 718, allowing multiple recipients to be used, and then selects the contactee dropdown 713, which causes the computer system to determine and display a list of available recipients at step 525. The computer system 203 determines available recipients from stored contactee details, which can be obtained from any one of a number of sources, such as an address book created using the message centre, or associated with an existing software application, by downloading recipient details from a remote store, such as the database 211, or the like. The recipients can be displayed in a dropdown list, dialogue box or the like, allowing the user to select desired recipients from the list at step 530. In the event that no information regarding recipients is available, the computer system can display a dialogue box requesting that the user provide appropriate details. Alternatively, recipients can be added using the add recipient button 708.

It will be appreciated that the user can select multi-recipient option and select recipients, in that order, or the user can select mediums and priorities first, so that effectively steps 520 to 530 could precede steps 510 to 515. The order shown is therefore for the purpose of example only.

At step 535, the computer system 203 determines available mediums for each selected recipient. This is typically achieved by reviewing the recipient details and determining for which communications mediums contact details are provided. For example, if the recipient details for an individual include an e-mail address and mobile phone number only, this allows e-mail, phone and SMS communication only to be used. At step 540, the computer system updates the message centre interface to display the recipients and the available mediums as shown for example in FIG. 7B. Not only does it show which of the selected mediums is available, it also shows which ones have been automatically selected, based on the priorities given to each of the selected mediums.

In this example, the check boxes 703 are used to show the different available communications medium types, as well as to allow the user to select respective ones of the available types, at step 550.

At step 550 after the user has updated mediums for each recipient, the process moves onto step 555 to allow the user to create a message, for example by selecting the edit message content or edit master message content 706, 707 controls. At this stage, the computer system 203 displays a message editor which may be in the form of an individual message editor or a template message editor as will be described in more detail below. It will be appreciated that this may form an integrated part of the message centre, or may be achieved by the operator triggering the launch of a separate application, such as a word processor, or the like, or it may consist of the editor automating or partially automating or combing with a separate application.

At step 560 the user edits or creates a message or message template optionally defining message variations for each message medium. If the user edits a message template or the master message, message variations can optionally be defined for each recipient type, at step 565. Examples of this process will be described in more detail below.

At step 570 the computer system 203 stores the message and any variations for different message mediums, as message data. The message data may be stored at any suitable location, such as in internal memory 401, or the remote database 211, allowing the user to select the send message option 710, at step 575. Following selection of the send option, the computer system 203 moves onto the process shown in FIG. 6.

In order to send the message the computer system 203 selects the message medium with the next highest priority at step 600 and then determines recipients associated with the selected medium at step 605. At step 610 the computer determines the message associated with the selected medium, by retrieving the stored message data. At this stage, messages for current medium are individualised, as will be described in more detail below. The content of recipient specific messages may be individualised in any one of a number of circumstances, including but are not limited to:

viewing the recipient specific message in the message editor,
changing the recipient for the current recipient record whilst the message editor is open,
changing the recipient type for the current recipient record whilst the message editor is open.

If the message has already been individualised and master content has not since been edited, then the Message Centre retrieves the stored, individualised message data, otherwise it generates it using the master message and relevant details of the recipient.

The message is then sent via the medium at step 615. It will be appreciated that the manner in which the message is sent depends to a large extent on the software and hardware configuration of the computer system 203. For example, if the message is to be sent as a fax, and fax capabilities are not available in the computer system 203, then the message, together with recipient details can be submitted to the base station 201, allowing the fax to be sent by the fax machine 311. Alternatively, the computer system 203 may include applications software, such as a fax server, allowing the fax to be sent. In this instance, the message centre application would trigger the launching of the fax server, and supply the message and recipient details in a suitable manner to allow the fax to be sent. It will be appreciated that sending messages in other manners will also be handled in a similar way depending on the implementation, as will be described in more detail below.

At step 620 an assessment is made of whether all mediums are complete and if not the process returns to step 600 to repeat the process using the medium with the next highest priority. Otherwise the process finishes at step 625.

During this process, the computer system 203 can update the message status indicator 715 on the message centre interface, allowing the user to review the transfer process, and in particular verify once the message is sent. Where available, this process can also be used to track receipt of the message. For example, by using the confirmation of fax receipt provided by a fax machine, or using a return e-mail in the case of e-mail messaging.

Accordingly, the above described system provides a mechanism to allow users to select one or more communications mediums for one or more recipients, and then provide content to the recipients using the selected mediums. In one example, this can be used to send messages to multiple individuals via one or more different message mediums, such as SMS, e-mail, fax, phone, letter, or the like.

The system can be used in a number of different environments. Thus, for example, it can be used by an entity, such as an organisation, to send messages or other information to members. This can be used to provide information to subscribers by service providers or the like. Additionally, this can allow companies to provide information to customers.

The system is particularly useful when it is required to contact recipients with a degree of urgency or certainty. In particular, the process allows messages or other content to be transferred to users via multiple mediums either simultaneously, or in sequence, thereby helping to ensure that the message is received. As a consequence, this has major utility in emergency situations, for example, if a government were required to alert citizens to an impending emergency situation or the like. Similarly, this is also of use to companies when they are required to contact customers, for example due to a product recall, or cancellation or delays to forthcoming events, such as concerts, airline flights, or the like.

Thus, the above described process can provide a structured, simple, highly automated, easily repeated, intuitive and meaningful way of using multiple communications mediums to communicate with multiple recipients.

The process allows for easy production, display, storage and retrieval of bulk messages (i.e. standard message, using one or more mediums, sent to any number of people), with the content automatically individualised. The process can allow convenient repeating of multi-medium messages through the use of Message Templates which allow every aspect of the message content, including word processor document templates, to be duplicated and with only a few mouse clicks.

The process can utilise prioritisation of communications mediums, allowing a number of different communications mediums to be used simultaneously, or in turn, depending on the preferred implementation.

The capabilities described above can be combined to produce some unique communications strategies.

Using highest priority (most preferred) medium only involves sending messages to multiple recipients using the most preferred (highest priority) medium available to each recipient, determined on a recipient-by-recipient basis.

So for example, if a priority of 1 (the top priority) is given to text messaging (SMS), then all selected recipients that are identified as being able to receive text messages (i.e. they have a recorded mobile phone number) will automatically have the text messaging medium selected. If the next priority is Email, then all those recipients that do not have SMS but do have email will be sent an email. This approach is ideal for when a specific medium is preferred, but if recipients don't have that medium, an alternative medium must be used.

Using multiple mediums to give higher success rate of message getting through can be used when it is imperative that the message gets through in one form or another, or that recipients see it in as many forms as possible, multiple mediums may be selected with all given the same priority. The recipient then receives the message via all selected mediums available to the recipient. This technique is useful for conveying messages of an urgent nature, for example if a student at a school is injured and the guardian is required to attend as a matter of urgency. As another example, a business may use multiple mediums to reach potential customers, because it believes that the combined affect of seeing their sales materials in several mediums will be more effective than just the one medium.

This technique is achieved by selecting all the required message mediums in the master message and making their priorities the same.

Complementary mediums/multi-part messages use two or more mediums as a multi-part message with each part performing a different function. This can be useful when one medium is more suited to conveying the message or part of the message, and another medium is more suited to getting the attention of the recipient. For example a team leader may have a number of word processor and spreadsheet documents that he wants reviewed by his team members. He may send a brief text message to advise his staff that an email has been forwarded to them that requires their immediate attention. The email would contain the word processor and spreadsheet documents. This technique is achieved by selecting all the required message mediums in the master message and making their priorities the same.

Using preferred message medium clusters is achieved by combining the use of a highest priority medium and multiple mediums. This is useful for recipients that don't have the higher priority medium available. In place of the preferred medium, two or more alternative mediums may be selected. For example, group members that can't receive the message via SMS (which is often virtually instantaneous and is effective at gaining the attention of the recipient) may be sent an email and a fax, which are also immediate but in general may not be as effective, individually, at gaining the recipient's attention, but their combined effect may be an acceptable substitute for an SMS. To implement this example using the current system, SMS would be set to a priority of 1 and email and fax would both have a priority of 2.

It will be appreciated that this can result in a number of benefits.

For example, this allows consistent and structured communications to be achieved, avoiding scenarios in which potential recipients are missed. Even those mediums which cannot be highly automated are made more structured, so that whilst making phone calls is still a largely manual process the process can be at least used to direct and record call completion. This ensures that all selected recipients are phoned. After the user selects the recipients, he can then see those that have been phoned successfully and those that haven't. When phoning a recipient, the user can see the key discussion points and record notes of the phone call. All relevant phone numbers are listed for the convenience of the user.

The process ensures creation of sophisticated communication with any number of recipients is quick and intuitive, thereby easing the communications process for the user, which is particularly important when a large number of recipients are to be contacted or provided with content.

The process can help ensure standardisation of messages and content delivery resulting in consistent, more professional company image. This can be achieved through the centralising of message templates, so that all authorised users with access to the local area network work with the same message templates. There is no need to search for MS Word document templates that could be somewhere on some PC on the network, as all authorised, networked PCs can have access to the messages in one central location. This means standard message templates are created once and only once, reducing time, effort and inconsistency.

The process can result in significant time savings by allowing commonly used messages, such as welcoming new members, to be created in just a few mouse clicks using comprehensive message templates that incorporate all aspects of message content. So the user gets polished, attractive and effective communication.

The process allows content delivery to be targeted using the most effective method for each recipient, thereby maximising the effectiveness of the process. Thus, for example, for the younger demographic text messaging might be best, for another demographic a refined letter might be best.

The process allows communications in a number of forms to be controlled via a single interface. Instead of manually locating and starting separate programs eg email client, word processor, contact management program etc, the user can communicate with multiple mediums from the one place. With just a few mouse clicks, messages for every recipient can be created and sent, using the most suitable communication medium for each recipient. The program automatically creates individual messages for each recipient according to the mediums they have available to them. The program also clearly displays those recipients that have none of the selected mediums, allowing for corrective action (eg selecting another medium or getting missing contact details for the recipient in question).

The process can be used to communicate with groups, families, organisations and other entity types and not just individuals, thereby allowing a user to control communication in an intuitive manner.

Furthermore, the process can be used to communicate using multiple mediums for each recipient simultaneously. For example an SMS message could be sent to notify a recipient that they have been sent a letter. This would be advantageous if for example one medium such as an SMS is more likely to be quickly noticed by the recipient, than another medium such as a letter which may involve collection from a post office and the corresponding delays in receiving the communication.

In addition mediums such as SMS may be more effective at making the recipient aware of a matter, while another medium, such as email, may be better at delivering the content in an optimised manner. It is common for people to take their mobile phones (the most common device used to access SMS messages) nearly everywhere with them, whereas many people are away from their computers (the most common device used to access email) for a large proportion of each day. This means that many people will become aware they have received an SMS message virtually immediately after it is sent, whereas they may not become aware they have received an email until some hours later. Thus, the process can arrange for a first medium to be used to ensure that a recipient is made aware that content has been supplied via a second medium.

A specific example of the process of creating and sending messages using message centre applications software will now be described in more detail. It will be appreciated that this example is for the purpose of explanation only, and is not intended to be limiting.

Overview of Message Centre

The message centre applications software executed by the computer system 203 enables multiple, disparate communications mediums to be combined in a meaningful, intuitive and highly automated way, for the purpose of sending personalised messages to multiple recipients. There is no need to ensure that all recipients have access to specific message mediums. In fact the selected recipients may have a diverse range of message mediums available to them. In other words, the Message Centre allows for the combining of multiple communications mediums, such as SMS, email, letter, phone and fax, together into one overall message, sent to many recipients with each recipient receiving one or more personalised messages.

The Message Centre enables message mediums to be selected and prioritised in just one location and then automatically applied to all recipients. The Message Centre automatically selects communications mediums for each recipient according to the selected message medium priorities and the mediums available to each recipient. These default selections for each Recipient Specific Message can be manually overridden by the user simply clicking the appropriate checkbox control.

Priorities can be assigned to message mediums in the master message. When combined with mediums the recipient has available this allows the priority and associated rules to be used to determine the mediums that are selected automatically for each recipient. If an Inclusive rule is applied, all message mediums at the highest priority level, which are available to each recipient, will be selected by default. If at least one medium at the highest priority level is available to the recipient then no message mediums at lower priority levels will be selected. If no message mediums at the highest priority level are available then if one or more mediums are available at the next highest priority level then all available mediums at this priority level will be selected. No message mediums at lower priority levels will be selected. This same logic is applied to all message medium priority levels.

For example, if it is important that a message be delivered as quickly as possible, the user of the Message Centre may choose to send an SMS to all that have it available, an email to those that don't have SMS and a fax to those that have neither SMS or email in the belief that a text message is most likely to be noticed by the recipient, followed by email and then fax. To implement this, the user would give SMS a priority of 1, email a priority of 2 and fax a priority of 3. The user would then select all intended message recipients. Some of the selected recipients may have an SMS capable phone available, others may have phone and letters available, others may have letter, phone, SMS and email etc. In the example, all those with SMS available would automatically be selected to receive SMS only (even if they have email and/or fax available), those with email would have email only selected and those with fax would have fax only selected.

As well as determining default medium selections, Master Messages can be used to determine default message content of each recipient specific message. The Message Centre creates message text for each selected medium of each Recipient Message. It takes the master text and individualises it by converting any placeholders in the Master text into the actual value for the recipient. So for example the placeholder [Surname] would be converted to 'Smith' for the recipient 'Bill Smith'. The master text for each of the communication mediums can contain field placeholders. The individualised message text created by default for Recipient Messages can be replaced or modified manually. This is known as 'customising' the Recipient Specific message. The customised message can then be 'locked' to prevent any future changes to the master message text overriding the manually customised message.

Master message text can be created for each medium and for each recipient type. So for example, in a message where the fax medium is selected, a separate master message can be prepared for Individuals, Families, Groups and Organisations. The Field Placeholders available are specific to each recipient type. Only relevant placeholders are available for each recipient type. For example the [Firstname] Field Placeholder is appropriate for the Individual recipient types but not for Families, Groups or Organisations. Likewise the [MembersFullNames] Field Placeholder is only relevant to the Group recipient type.

Master messages also determine the word processor document templates that will be used in the construction of letter and fax mail merges. The Master Message also determines other details such as which of the recipient's email addresses to use by default eg work, personal, family email address etc.

Recipient Types

The use of family, group and organisation recipient types enables automatic communication with all the entities that are commonly dealt with. Message Centre enables communication with families, groups and external organisations, as well as individuals, in an intuitive and convenient way that requires no specialist knowledge. Some of the benefits of incorporating these other recipient types, into Message Centre, are discussed below.

No special knowledge required—Conventionally, the person initiating a mass communication would need to know which person within the family, group or organisation to direct the communication to. This requires that they are familiar with each recipient or that they draw on the knowledge of someone who is familiar with them. With Communications Centre, only the family, group or organisation needs to be selected, eliminating the need for any special knowledge. Message Centre automatically selects the appropriate member of each family, group or organisation to direct the communication to. So a new, unskilled recruit can perform the communication, allowing more experienced staff to be employed more productively elsewhere.

Save time and effort—Message Centre eliminates the need to identify the person to direct the communication to saving the time and effort required to do this manually.

Increase efficiency—by re-using standard messages. Message Templates combined with family, group and organisation Recipient types, enable tried and true messages to be re-used again and again with minimal effort. Being able to configure a Message Template for all recipient types means that the message will make sense, no matter which type of recipient it is sent to.

Avoid possible embarrassment—by ensuring all information is accurate. Placeholders that are appropriate for each Recipient type are provided when editing the master message. This makes it easy to construct messages that make sense for each Recipient type. When the message is sent, Communications Centre looks up the current value of the placeholder, for the recipient being processed and replaces the placeholder with the actual value. This helps ensure that each separate message makes sense, is directed to appropriate individuals and contains accurate data. So names, contact numbers, addresses and so on are always correct (as long as the underlying data is correct).

In addition to the use of recipient types, it is also possible to use the computer system 203 to perform a search of recipients or specific recipient types, for example based on attributes of individuals or recipient types, demographic information, or the like.

Overview of Creating and Sending a Message

The first step when creating a new message is to select the message type. This is done by left-clicking the desired message type in the [Message type] listbox 719. If the message is to be sent to multiple recipients, the multiple recipients button 718 is selected. This converts the message from a single recipient message, which is created by default, to a multi-recipient message capable of catering for practically unlimited recipients.

If one of the single medium messages is created then there is no need to select mediums or set priorities since there is only one medium. Therefore the medium select and prioritise controls on the Message Centre form will be unavailable when one of the single medium message types is selected.

If a single recipient message is created (either multi-medium or single-medium message types) then there is no need to work with a master message, as there is only a recipient specific message and it is created directly, ie there is no master message visible to the user. As such any controls related to working with the Master message are generally not visible or are indicated to be inactive. There remains however, the ability to select a message template to base the message content on. When a template is selected the recipient specific message is automatically individualised. If the recipient is changed then the message is re-individualised so as to be accurate for the new recipient.

The remainder of this example will focus on Multi-Medium, Multi-Recipient messages. This is done because the functionality of Multi-Medium, Multi-Recipient messages is a superset of the functionality available via single medium and single recipient messages. So by covering Multi-Medium, Multi-Recipient messages all key aspects of creating single medium and single recipient messages are also covered.

With the message type selected there are five basic steps involved in constructing and sending a Multi Medium message, including:

selecting message mediums
   selecting recipients selecting sender
   selecting message template (and/or edit the master message) and
   sending.

Selecting Message Type

Figure 7A:
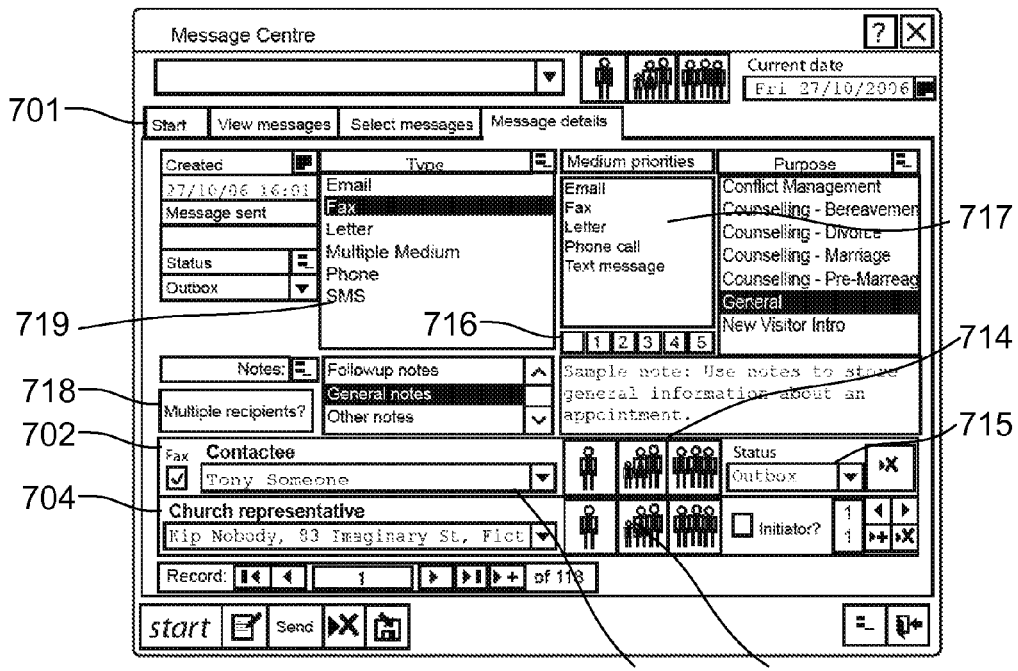
FIGS. 7A to 7C are screen shots of an example of an interface for sending messages.
Figure 7B:
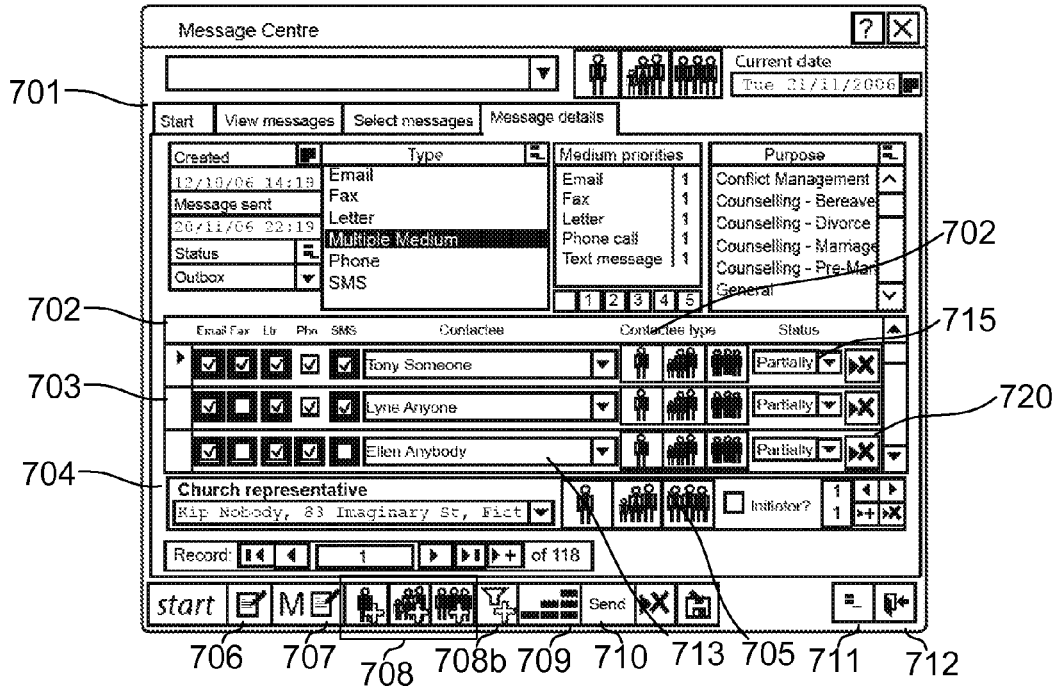

To create a single medium message, the first step is to select the desired message medium, which is shown for example in FIG. 7A as 'Fax'. The message medium priority controls 716 are not available since they are not relevant. By default a single recipient message is created. If the message is to be sent to more than one recipient, the left-click the multiple recipients button 718. This converts the message to a multi-recipient message, as shown for example in FIG. 7B (it should be noted that in the example of FIG. 7B multiple mediums are also selected). In addition, multiple recipients are now displayed, obscuring the Multiple recipients toggle button and other controls that are visible in FIG. 7A.

Multi-recipient messages have a master message, which is used to create each recipient specific message. The [Master Message] button 707 opens the Message Editor to enable editing of the master message. The [Add recipient] buttons 708 enable quick and efficient adding of multiple individuals. Other recipients can be added/edited/viewed through use of these buttons. Alternatively multiple recipients can be displayed at the one time through use of the [Display recipients] button 709. This cycles through the display of one, three and greater than five recipients.

Note that after selecting the [Multiple recipients] button the form footer changes. Controls that give access to features such as master message, adding multiple recipients at once and cycling between a number of recipients on display are now available.

Placeholders

FIGS. 8A through to 8D are of various aspects of the Message Template Manager which allow creating, modifying, deleting, duplicating, importing and exporting of message templates.

Message Editor makes available two kinds of placeholders, Field Placeholders and Bookmark Placeholders. Both are discussed in more detail below with reference to FIGS. 8A to 8D.

In the example of FIG. 8A, text for the SMS component of a template message is being entered. The 'FirstName' Field Placeholder 801 is selected by right clicking (pressing down on the right mouse button) in the desired location of the SMS text control. This displays the Placeholders shortcut menu 802. The cursor is moved over the 'Insert [Firstname] field' menu option 803 and left-clicked. This inserts the [Firstname] field placeholder in the text, at the place where the mouse was initially right-clicked. The remainder of the message is constructed by typing and inserting field placeholders as required.

Once complete, the message can be previewed, as shown in FIG. 8B. This converts placeholders into sample values, to help assess the effectiveness of the message. In the example the message author intends that the words 'Instructions for responding' will be overtyped with relevant text, each time a message is created based on this template.

It will be appreciated that in one example, the sample values are used by default. However, in an alternative example, the sample values can be displayed to an operator, allowing the operator to modify the sample values to make them more appropriate. Thus, for example, the placeholder may include [firstname], which would result in the placeholder being replaced by the intended recipient's first name. However, in the event that the sender personally knows one of the selected recipients, the sender may choose to manually substitute the recipient's first name with a nickname, for that one recipient only. Thus, in this example, the sample value can be replaced by a user defined value.

Once the SMS message text for the Individual recipient type is complete, an equivalent message must be constructed for the other recipient types, as shown in FIGS. 8C and 8D, which show an SMS text for a family and SMS text for a group respectively.

Bookmark placeholders can also be included in the master text, and these correspond to pre-defined bookmarks in a word processor document. Bookmark placeholders are only used in conjunction with fax and letter communication mediums ie those communications mediums that involve interaction with a word processor application. Bookmark placeholders allow the precise positioning of text in the word processor document, and the precise formatting of that text. Any text following a bookmark placeholder is positioned to start at the corresponding bookmark in the word processor document. For example, any text placed after [BookMarkName:Title] in the master message will be placed at the 'Title' bookmark in the document. The text will assume the formatting of the word processor document text at the bookmark. It is intended that the system would interrogate the word processor document to discover all defined bookmarks in the document and present these to the operator in the form of a list rather than requiring the operator to manually enter the required bookmark names.

Inserting a bookmark placeholder is a two step process, first the empty placeholder, is inserted. This is done by right clicking in the appropriate part of text and selecting the item Insert [BookmarkName] field. A valid bookmark is entered, eg "Title", between the colon and the closing bracket. Correct use of bookmark placeholders enables a document template to be created just once, with polished formatting and precise positioning of bookmarks, and then reused many times with only minor adjustment to the text of the Master Message. In the example above the words 'Instructions for responding' would be replaced with text relevant to the specific message. The word processor document template takes care of document formatting and placement of elements while the master text takes care of the wording of specific parts of the message. The word processor document template can also contain generic text that is not affected by the master message for example a slogan or legal disclaimer.

Placeholders may also be provided which enable messages to be tailored based on attributes of the selected recipients. Thus, for example, the placeholder [he_she_they] will automatically display the appropriate value depending on the gender and/or the number of the message recipients. This is particularly useful when the selected recipients are a subset of a defined group, family or organisation. It will be appreciated that the values used to replace the placeholders may depend one any suitable recipient attribute, such as the gender, age, location, or the like, as well as on the nature of the communications medium used to transfer the message, or the recipient type (eg. group, organisation, family).

Message Editor

Figure 9:
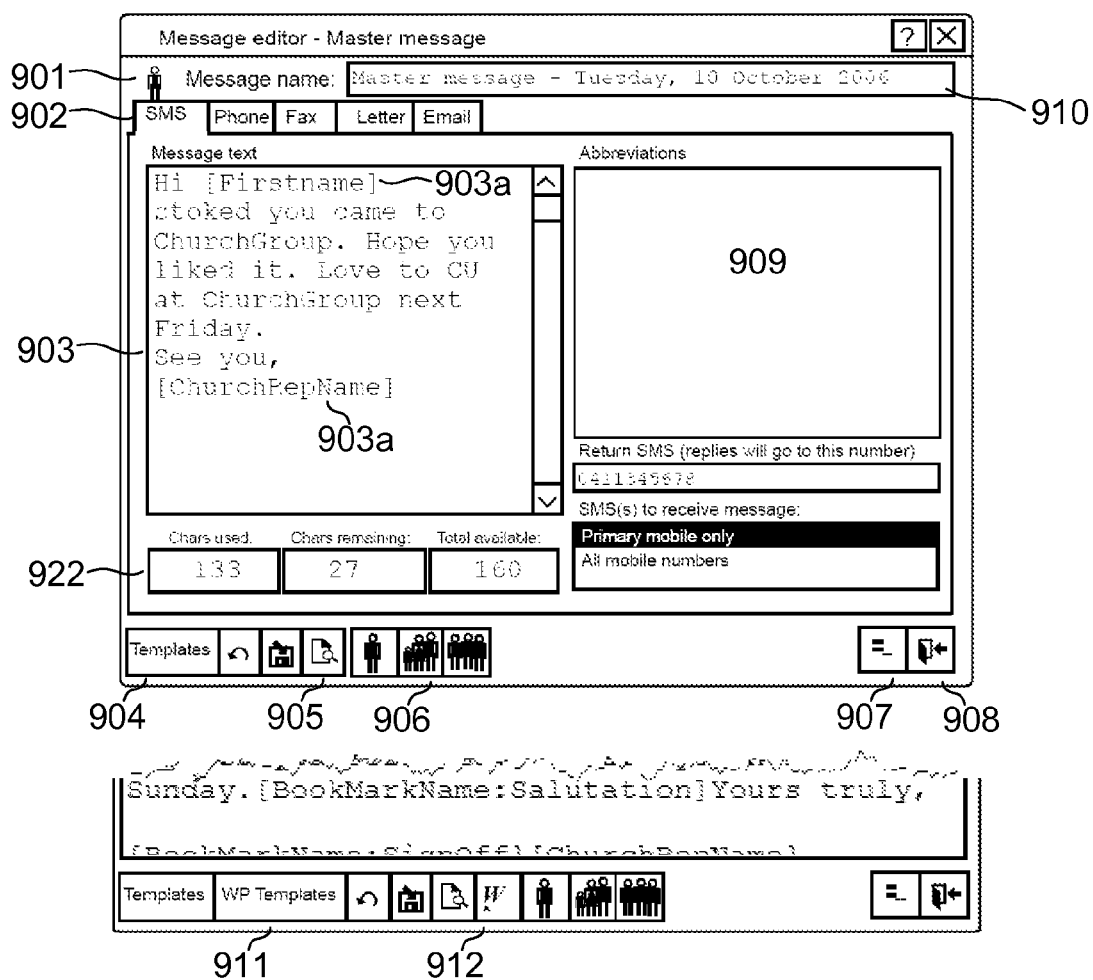
FIG. 9 is a screen shot of an example of an editor interface used for editing a master message.

An example of the message editor interface in a master edit mode, used for defining a master message, is shown in FIG. 9. In this example, the Message Editor is displaying a Master SMS message. The Message Editor, in Master Message mode, is similar for the other message mediums (without the SMS specific controls such as [Return SMS]). However the pages for Fax and Letter message mediums have a several footer controls shown in 911 and 912 below.

Examples of controls that can be provided in a message editor interface include:

Recipient type icon 901. Indicates the type of entity (individual, family, group or organisation) that is being edited.

Tab page labels 902. Allows selection of desired message medium page via mouse clicks.

SMS message text control 903. Enables the master message text to be edited. The text items between square brackets 903A are placeholders that will be customised or individualised for each recipient.

Template toggle button 904. Configures the Message Editor to enable selection and editing of message templates. The user is enabled to select and apply a pre-defined message template, open the Message Template manager (which allows creation, duplication, editing and deletion of message templates) or save the current message as a message template.

Text preview button 905. Displays the text with placeholders converted to sample values. This enables reviewing of the message without being distracted by placeholders.

Recipient type selector 906. Allows selection of the Recipient type (individual, family, group or organisation).

Options button 907. Enables setting of preferences for communications related options such as user name, account number for text messaging service.

Close button 908.

Abbreviations control 909. Allows abbreviations commonly used in text messages to be listed alongside the full word. Users can edit this list to suit their individual preferences. When a word is selected in the message text control any matching abbreviations will be highlighted (drawing the user's attention to the abbreviation). Optionally the full word can be automatically replaced by the abbreviation.

Message name 910. Enables setting of message name, to give a meaningful name to the master message.

WP Templates toggle button 911. Puts Message Editor into/out of WP (word processor) configuration. WP configuration allows selection of either WP Select or WP Manage modes. WP Select mode allows the selection of a WP template for all recipient types and all mediums or for the current recipient type and all mediums or for the current medium and all recipient types or for the current medium and current recipient type. WP Manage mode allows the editing, importing, duplicating and deleting of Word Processor templates.

WP button 912. Opens the Mail Merge master document for editing. Right clicking gives access to further options; regenerate Mail Merge Master doc, open Mail Merge result doc and Regenerate Mail Merge result doc.

Number of character controls 922. Display the number of characters used, the number remaining and the total available. These controls help keep text messages below the maximum permissible number of characters.

Figure 10:
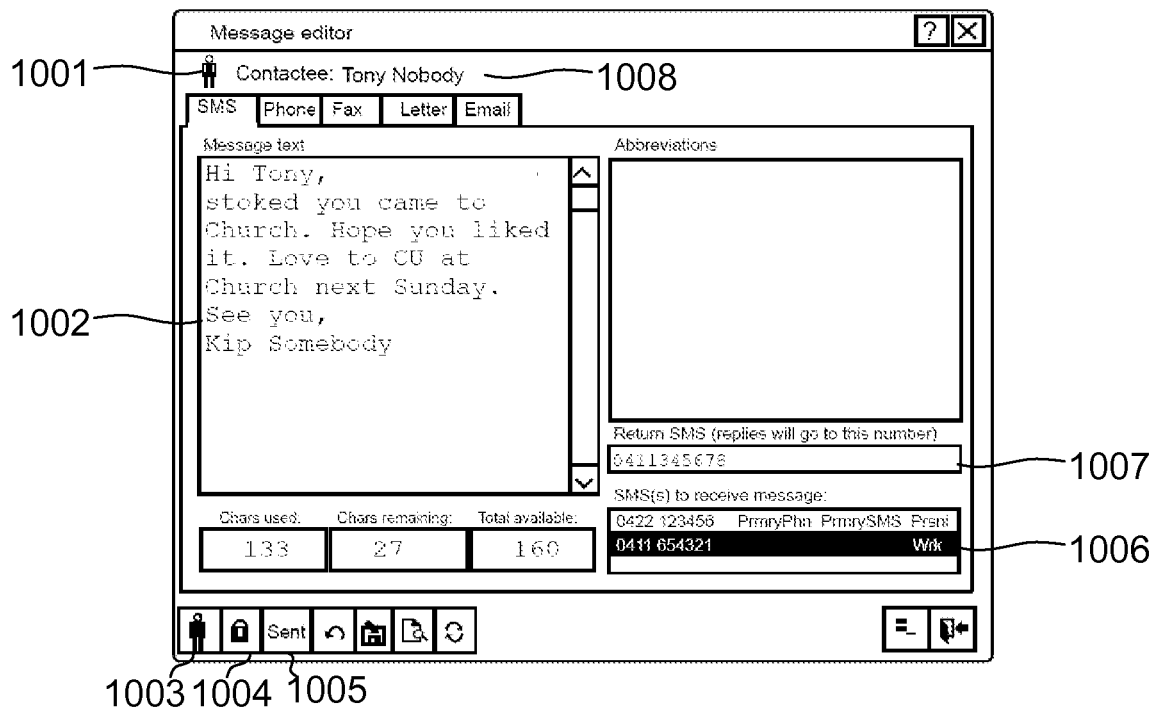
FIG. 10 is a screen shot of an example of an editor interface used for editing an SMS message.

An example of the message editor in message edit mode is shown in FIG. 10. In this example when a Recipient Message is first edited, all components of the message are individualised. For SMS messages, this means field placeholders in the master message text are replaced with the corresponding actual values of the recipient. So for example, [FirstName] is replaced with the recipient's actual first name (without surrounding brackets). In FIG. 10, [FirstName] has been replaced with 'Tony'. Similarly, actual values have replaced symbolic values eg the actual mobile phone number(s) of the recipient are displayed in the [Recipient SMS number] control 1006, in place of the symbolic value 'Primary mobile only.

The aspects of the message which have been automatically individualised can be further customised. So for example if a specific recipient should receive say, a message of thanks at the end of the text, this can be added. Or if the recipient has multiple phone numbers capable of receiving Text messages, then a different one can be chosen. So for example, the mobile phone selected by default may be the recipient's work mobile phone. For the message in this example it may be more appropriate to use the recipients personal mobile phone, so the user would simply select it from the [Recipient SMS number] control.

As soon as the application detects that the message has been customsied it 'locks' the message. This ensures that future changes to the master message do not over write the customisations made to the message. The [Lock] button 1004 will appear to be depressed, indicating that the message is locked. The method of customising an SMS message as described above, is broadly the same method taken to customise any of the message mediums.

Notice that the Recipient type selector controls 906, are no longer available in the form footer. This is because switching between Recipient types only makes sense when editing the master message, since the master message must be able to cater for recipients of any recipient type. When editing a specific recipient, the Message editor automatically displays only the correct recipient type (that of the displayed recipient).

Examples of the controls provided on the interface in the example of FIG. 10 include:

Recipient type icon 1001. Indicates the type of entity (individual, family, group or organisation) of the selected recipient. Applies to all message mediums.

Message text 1002. Displays the actual message that the recipient will be sent.

Individual details button 1003. Selecting this button opens the Individual details form which allows editing of phone numbers, email address and other details of the individual. If the selected recipient were a family then in place of the Individual details button, the Family details button would be displayed. Similar again for recipients of group or organisation Recipient type. Applies to all message mediums Lock button 1004. Indicates whether the message is locked. When locked, the message content is not updated when the master content changes. Unlocked messages are automatically updated when the master message changes. Locking a message allows the message to be customised for a specific recipient secure in the knowledge that the customising will not be overwritten by future changes to the master message. Applies to all message mediums. A locked message can be unlocked by simply left-clicking the Lock button 1004.

Recipient SMS number 1006. Displays the mobile phone number to which the message will be sent. The text to the right of the phone number indicates that the highlighted number is nominated as the Primary phone of the recipient and the Primary number to use for receiving Text messages.

Return SMS number 1007. The number to which any recipient replies will be sent. So if a recipient receives an SMS message and replies to it, the reply SMS will be sent to the Return SMS number.

Contactee name 1008. Displays the name of the selected recipient. Applies to all message mediums.

Message Template Manager

Figure 11:
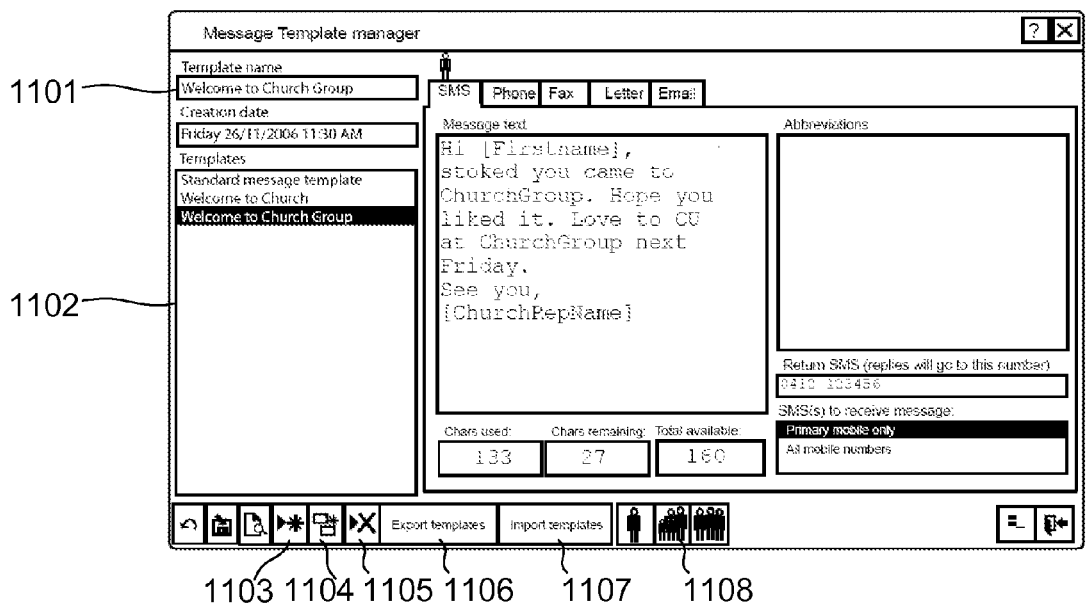
FIG. 11 is a screen shot of an example of a message template manager interface.

The Message Template Manager provides a convenient way to create and manage Message Templates. All non-system templates are displayed (system templates are reserved for application use). Message Template Manager enables creation of templates, editing, deleting, duplicating, renaming, importing and exporting of Message Templates. These functions are discussed in detail below. An example of this will now be described with reference to FIG. 11.

In this example, the message template manager includes the following controls.

Template name control 1101. Displays the name of the Template on display and allows the name to be changed.

Message Template listing 1102. Displays all available Message Templates. A template is selected by clicking on the required template with the mouse or using the down and up arrows on the keyboard.

Create Template button 1103. Creates a new Message Template from scratch. Requires entry of a unique name.

Duplicate Template button 1104. Duplicates the currently selected Message Template. Supplies a default name.

Delete Template button 1105. Deletes the selected Template.

Export Templates button 1106. Configures Message Template Manager to allow exporting of templates to a selected file. If the selected file doesn't exist, it will be created. All aspects of the selected template are exported including any word processor document templates required to perform a mail merge.

Import Templates button 1107. Configures Message Template Manager to allow importing of templates. All aspects of the selected template are imported including any word processor document templates required to perform a mail merge.

Recipient type selector 1108. Allows display of the message content for the required Recipient type.

The template manager can be used to perform a number of different tasks as follows creating, editing, duplicating, deleting and renaming of templates. Additionally templates can be exported and imported.

The ability to both export and import Message Templates, in their entirety, facilitates their sharing. So if one organisation develops a Message Template that would be useful to another organisation, they can export the template and send the file containing the template to the other organisation. The other organisation simply imports the template from the other organisation and it is ready for immediate use. Sharing Message Templates is a way of sharing expertise across organisations and implementing a consistent corporate image within an organisation.

Message Template Selector

A message Template Selector can be used to help with selecting Message Templates. It enables all aspects of the template to be viewed. Since the Message Template Selector is intended for template selection only and not editing of templates, all controls are locked to prevent editing. Otherwise this is similar to the Message Template manager and will not be described in further detail.

Word Processor Document Templates

Word processor (WP) document templates can be used by Message Centre in the creation of letter and fax messages. The ability of Message Centre to combine document templates with Master Message text, allows for the creation of stylish, effective letters and faxes with the entry of just the required text, for the specific message, into the master message. When this is further combined with an appropriate Message Template that already contains the required text, it enables the creation of individually targeted letter and fax mail merges with not much more required other than the selection of message recipients.

Before the Message Centre can use a word processor document template, the document template must be imported. Alternatively a Message Template containing the required document template can be imported. Once a document template has been imported it can be edited, duplicated and deleted. Imported document templates are available for use in all fax and letter messages and Message Templates.

Selecting and Prioritising Message Mediums

An example process for selecting and prioritising message mediums will now be described in more detail. In particular, priorities are 'selected' in the Master Message by being assigned a priority of 1 or more. Message mediums are 'deselected' by assigning a null priority (this is done using the left most priority button which is blank in contrast to the other numbered buttons).

Figure 12A:
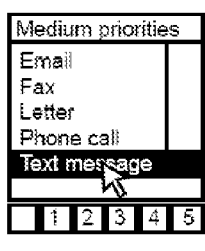
FIGS. 12A to 12C are screen shots of an example of the process of selecting message medium priorities.
Figure 12B:
Figure 12C:

The most preferred message medium is selected by selecting (left-clicking) the medium in the [Message medium] selector 717 and then assigning the medium the highest priority (1) by left-clicking on the No. 1 priority control 716. This process is repeated until all required message mediums have been selected. It should be noted that message mediums which are less preferred can be assigned a lower priority eg 2. FIGS. 12A and 12B illustrate selecting the message medium and then setting the priority. FIG. 12C illustrates the end result, with all required message mediums selected and prioritised.

Once a message of a specific message medium has been sent that message medium can not be deselected. So, for example, if an email is sent to a recipient, the priority of the Email message medium can not be set to nothing. If this is attempted a warning prompt is displayed.

The medium priority can however be changed to a non zero value. All sent messages of this medium cannot be separately deselected.

Figure 13:
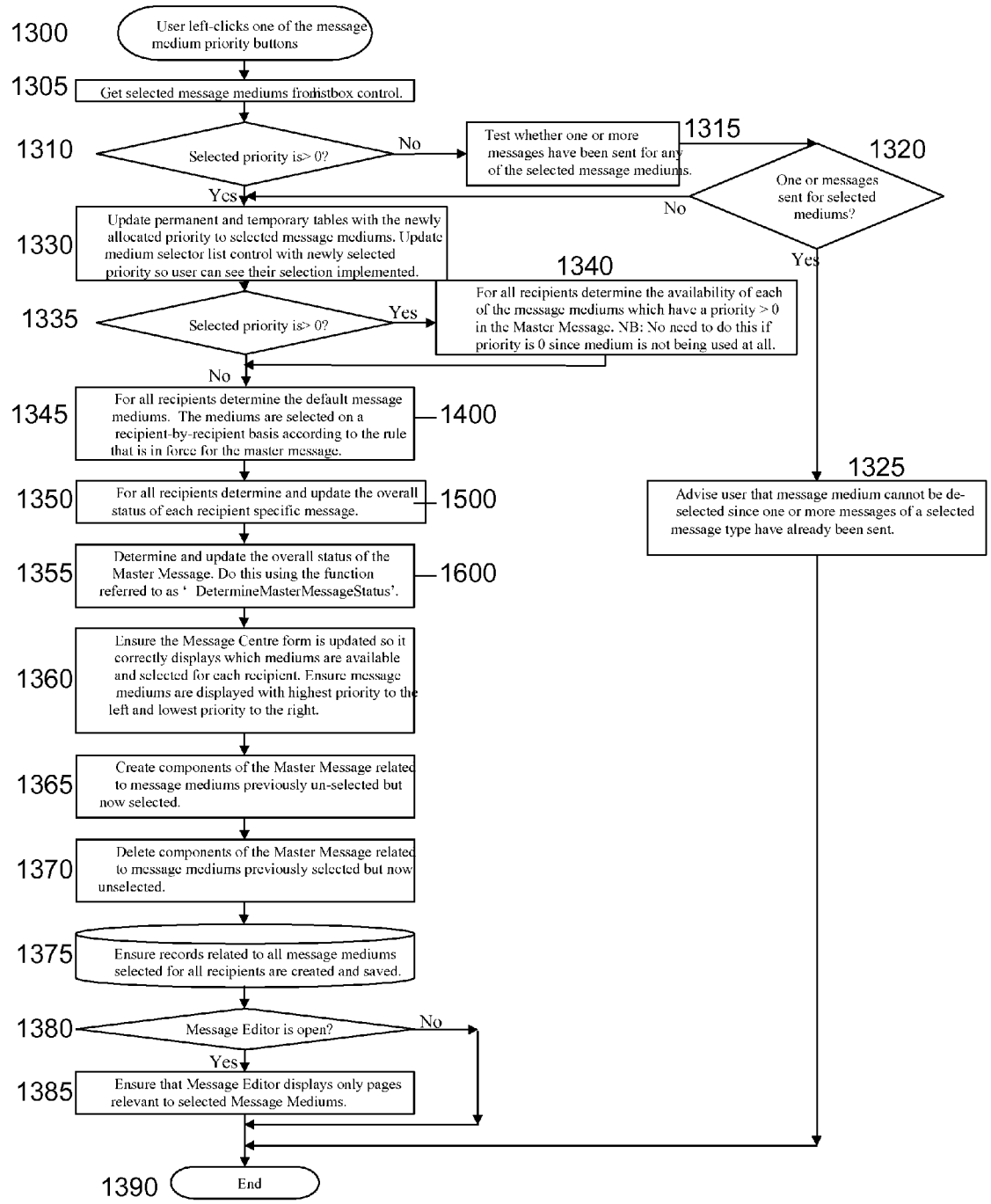
FIG. 13 is a flow chart of an example of a process for selecting a message medium priority.

The flowchart of FIG. 13 describes the major actions taken when the user selects one of the message medium priority buttons. The message medium priority buttons are only available to the user when one or more message mediums are selected and when a message of type Multi-Medium is being created/edited. The actions taken below ensure that all required message records exist and that the Message Centre form and Message Editor (if open) reflect the message mediums selected for the master message and the message mediums available and selected for each recipient message.

In the flowchart of FIG. 13, initially at step 1300 the user left clicks one of the message medium priority buttons which causes the computer system 203 to get the selected message mediums from the list box control at step 1305.

At step 1310 the computer system determines if the selected priority is greater than zero and if not tests whether one or more messages have been sent for any of the selected message mediums at step 1315. If messages for selected mediums have been sent at step 1320 the process moves on to step 1325 to advise the user that message medium cannot be deselected since one or more messages of a selected message type have already been sent. After this the process ends at step 1390.

However, if the priority is greater than zero, or if messages have not been sent, the process moves on to step 1330 with the computer system 203 operating to update permanent and temporary tables with the newly allocated priority to selected message mediums. The computer system also updates the medium selector list control with newly selected priorities so that the user can see their selection implemented.

At step 1335 the computer system 203 again assesses if the selected priority is greater than zero and if so, for all recipients, determines the availability of each of the message mediums which have a priority greater than zero in the master message.

If the selected priority is not greater than zero or once the availability has been checked at step 1340 the process moves to step 1345 with the computer system determining the default message mediums for all the recipients. The mediums are selected based on a recipient by recipient basis according to the rule that is in force for the master message, as will be described in more detail below with respect to FIG. 14.

At step 1350 the computer system determines and updates the overall status for each recipient specific message at step 1350, as will be described in more detail in FIG. 15. Following this at step 1355 the computer system determines and updates the overall status of the master message. This is achieved using the determined master message status as will be described in more detail below with respect to FIG. 16.

At step 1365 the computer system operates to create components of the master message related to message mediums previously unselected but now selected. Following this the computer system deletes components of the master message relating to message mediums previously selected but now unselected, ensuring that all the records related to all message mediums selected for all recipients are created and saved appropriately at step 1375.

At step 1380 the computer system 203 determines if the Message Editor is open. If the message editor is open, it displays pages according to whether the editor is in Master message mode or Edit message mode. If in Master message mode the Message Editor will display only pages relevant to the selected message mediums at step 1385. If in Edit message mode the Message Editor will display only pages relevant to the selected mediums of the currently displayed recipient. Otherwise, or once this is complete, the process moves on to step 1390 and ends.

In one example, the Message Centre automatically selects communications mediums for all recipients according to the selected message medium priorities, the mediums available to each recipient and any rule being applied.

Figure 14:
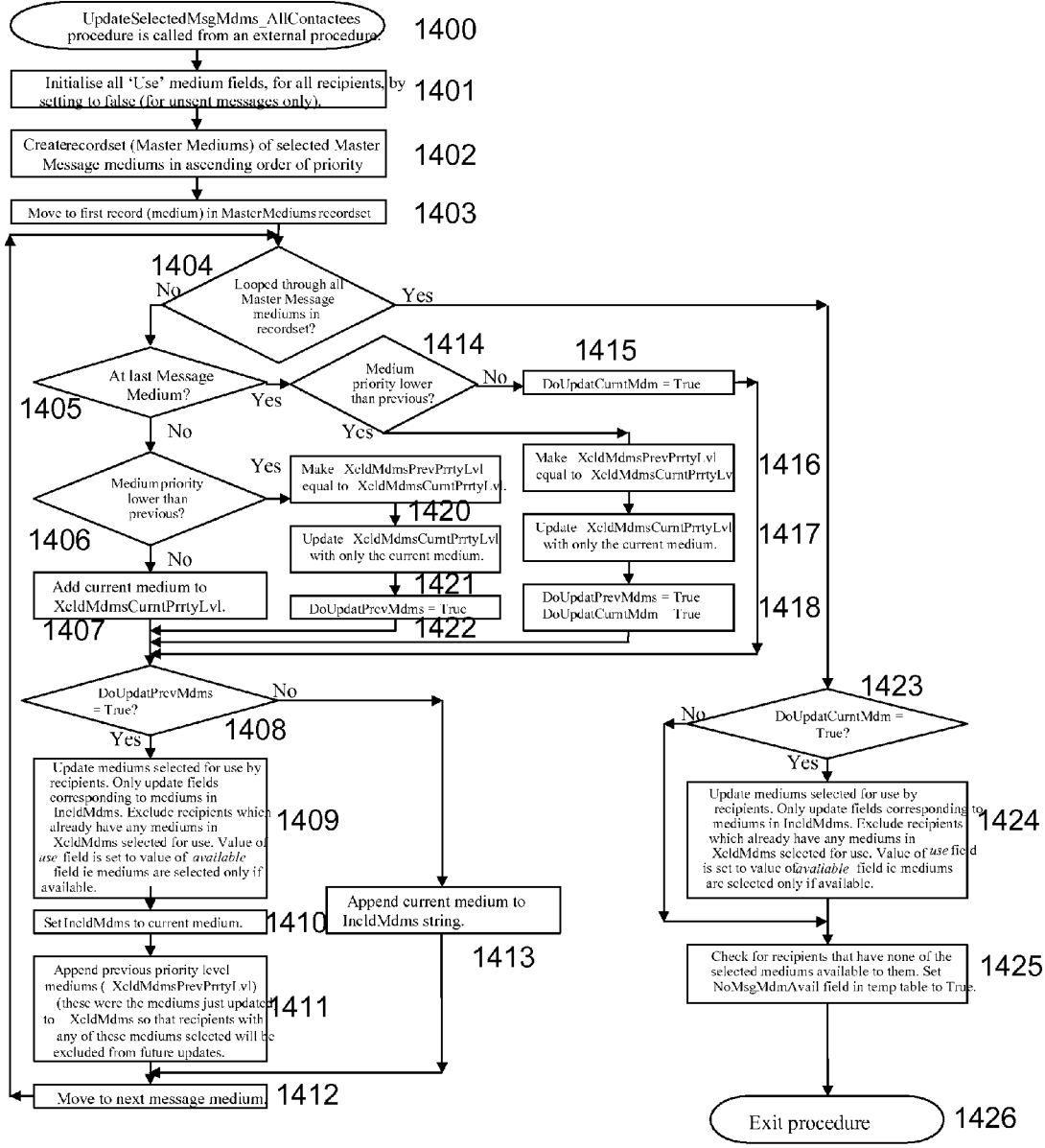
FIG. 14 is a flow chart of an example of a process of selecting a message medium for each recipient using a rule associated with a master message.

The flowchart of FIG. 14 describes the major actions taken in determining, for all recipients simultaneously, the message mediums to select by default for each recipient using an Inclusive rule.

In this example (with the Inclusive rule being applied), all message mediums at the highest priority level, which are available to each recipient, are selected by default. If at least one medium at the highest priority level is available to the recipient then no message mediums at lower priority levels will be selected. If no message mediums at the highest priority level are available then if one or more mediums are available at the next highest priority level then all available mediums at this priority level will be selected. No message mediums at lower priority levels will be selected. This same logic is applied to all remaining message medium priority levels.

The variables used in the flowchart of FIG. 14 and a brief description of the information stored in each variable is included in the list below.

DoUpdatPrevMdms—If yes then default selections for previous priority level are to be determined
DoUpdatCurntMdm—If yes then default selections for current priority level are to be determined
IncldMdms—Mediums that are to be updated
XcldMdms—Exclude recipients which have any of these mediums selected
XcldMdmsCurntPrrtyLvl—Mediums to be excluded at current priority level
XcldMdmsPrevPrrtyLvl—Mediums to be excluded at previous priority level Use Mediums fields are the fields in the temporary table which store whether a message medium is to be used for a specific recipient eg UseSMS, UsePhone, UseEmail etc.

When an exclusive rule is used, a similar process is followed. As with the Inclusive rule, the Message Centre automatically selects communications mediums for each recipient according to the selected message medium priorities, the mediums available to each recipient and the rule being applied. However, where the Inclusive rule will select mediums for a recipient at a priority level when at least one medium is available, with the exclusive rule, mediums will only be selected when all mediums at that priority level are available to the recipient.

This rule works by exclusively selecting priority groups i.e. a priority group will only be used if recipient has all mediums at that priority level. So, for example, if both Email and Letter had a priority level of 1, all recipients that had both these mediums would have these mediums selected by default. Recipients that had at most one of these priority level 1 mediums would have neither medium selected by default. Continuing the example, if SMS and fax were selected and assigned a priority level of 2, then any recipients that had both SMS and fax available but did not have both Email and letter available, would now have both SMS and fax mediums selected by default. If Phone was allocated a priority of 3, then all those without both Email and letter and without both SMS and fax, and with Phone available, would now have the phone medium selected by default.

Recipients that did not have all mediums of at least one priority group would be highlighted as having no mediums selected, even if they did have message mediums available. The user would then need to decide on a recipient-by-recipient basis, which mediums to use for these recipients with no messages selected by default.

It will be appreciated that other rules may be used, and that inclusive and exclusive rules are provided for the purpose of example only.

As an example of working with the 'Inclusive' rule, in the flowchart of FIG. 14 at step 1400 the computer system implements an update selected message mediums procedure which is called from an external procedure. Initially the computer system initialises all "use" medium fields for all recipients by setting the field to false for unsent messages only. At step 1402 the computer system creates a record set of master message mediums in ascending order of priority. So any message mediums with a priority of 1 would be at the top of the recordset followed by any message mediums with a priority of 2 followed by any with a priority of 3 etc.

At step 1403 the computer system moves to the first record medium in the master message record set and moves on to step 1404 to assess whether all mediums have yet been assessed. Variables DoUpdatPrevMdms and DoUpdatCurntMdm are set to False so that any values relevant to a previous loop of the code do not incorrectly affect the current loop. In this first case, at step 1405 the computer system 203 determines whether the last message medium is reached. If not the computer system 203 determines whether the medium priority is lower than the previous priority and if not proceeds on to step 1407 to add the current medium to an XcldMdmsCurntPrrtyLvl variable. Following this the procedure moves on to step 1408 to have the computer system 203 determine if the DoUpdatPrevMdms mediums variable is set to true. If so the computer system moves on to step 1409 to update mediums selected for use by the recipients. This process only updates fields corresponding to mediums in the Include Mediums variable and excludes recipients which have already had any mediums in the XcldMdms variable selected for use. The value of each of the use fields is set to the value of the corresponding available field i.e. each use field is set to true only if the corresponding medium is available. Following this at step 1410 the computer system 203 sets the IncldMdms variable to a current medium before appending previous priority level mediums at step 1411. Following this the process moves on to the next message medium at step 1412.

During this process if the DoUpdatPrevMdms variable is set to false the process moves to step 1413 allowing the current medium to be appended to the IncldMdms string. Again following this the process moves to step 1412 to select the next medium before returning to step 1404.

If it is assessed at step 1405 that the last message medium is reached, then at step 1414 the computer system assesses whether the medium priority is lower than previous priorities. If this is not the case then at step 1415 the computer system updates a DoUpdatCurntMdm variable as true before returning to step 1408. Otherwise at step 1416 the computer system makes the XcldMdmsPrevPrrtyLvl variable equal to the XcldMdmsCurntPrrtyLvl variable. Following this at step 1417 the computer system updates the XcldMdmsCurntPrrtyLvl variable with the current medium only before moving on to step 1418 to set variables DoUpdatPrevMdms and DoUpdatCurntMdm to true as indicated. Following this the process moves on to step 1408.

In the event that the medium priority is assessed as being lower than the previous priority at step 1406 the process moves on to step 1420 to make the current XcldMdmsPrevPrrtyLvl variable equal to XcldMdmsCurntPrrtyLvl variable. At step 1421 the computer system updates the XcldMdmsCurntPrrtyLvl variable with the current medium only before setting the DoUpdatPrevMdms variable to true at step 1422.

This process is repeated until the last message medium has been processed according to the steps executed between and including 1405 to 1422 at which point the process moves on to step 1423 to determine if the DoUpdatCurntMdm variable is set to true. If so the process moves on to step 1424 with the computer system operating to update mediums selected for use by the recipients.

In this example, only fields corresponding to mediums in the IncludMdms variable are updated and only for recipients who have not already had any mediums in the ExcludMdms variable selected for use. The value of the use field is set to a value of true for mediums that are available.

Following this, or if the DoUpdatCurntMdm variable is set to false, the process moves on to step 1425 to check for recipients that have none of the selected mediums available and sets the NoMsgMdmAvail field in the temp table to True for these recipients. The process exits at step 1426.

Determining Message Status

Figure 15:
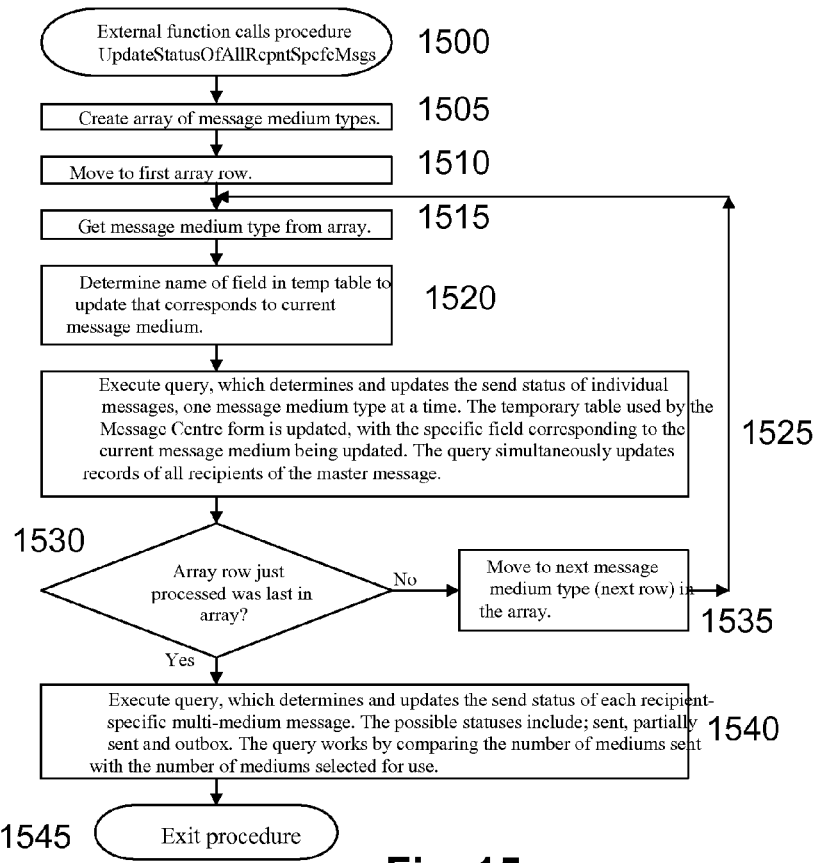
FIG. 15 is a flow chart of an example of a process for determining a message status for each recipient specific message.

The flowchart of FIG. 15 describes the actions taken to ensure that message send status correctly reflects the combined status of the component messages of each recipient specific message. The calculated status is recorded in the temporary table and displayed in the Message Centre form. The calculated status correctly reflects the combined status of each separate message for each recipient as recorded in permanent tables.

The process commences at step 1500 with the computer system 203 operating to call an external function procedure UpdateStatusofAllRcpntSpcfcMsgs. At step 1505 the computer system operates to create an array of all message mediums moving to a first array row at step 1510. At step 1515 the computer system gets from the array, the first message medium if moving to step 1515 from step 1510 or the next message medium if moving to step 1515 from step 1535, and then uses this at step 1520 to determine the name of the field in a temp table to update, which corresponds to the current message medium.

At step 1525 the computer system executes a query that determines and updates the send status of individual messages, one message medium at a time. To achieve this the temporary table used by the Message Centre form is updated with the specific field corresponding to the current message medium being updated as required. The query simultaneously updates records of all recipients of the master message.

Following this at step 1530 the computer system assesses whether the array row just processed was the last in the array and if not moves on to step 1535 to move to the next message medium type in the array before returning to step 1515 to allow this message medium type to be processed.

Once the last array row has been reached the process moves to step 1540 with the computer system executing a query which determines and updates the send status of each recipient specific multi-medium message. The possible status can include sent, partially sent and outbox (unsent). The query operates by comparing the number of mediums sent with the number of mediums selected for use. Following this the procedures exits at step 1545.

Figure 16:
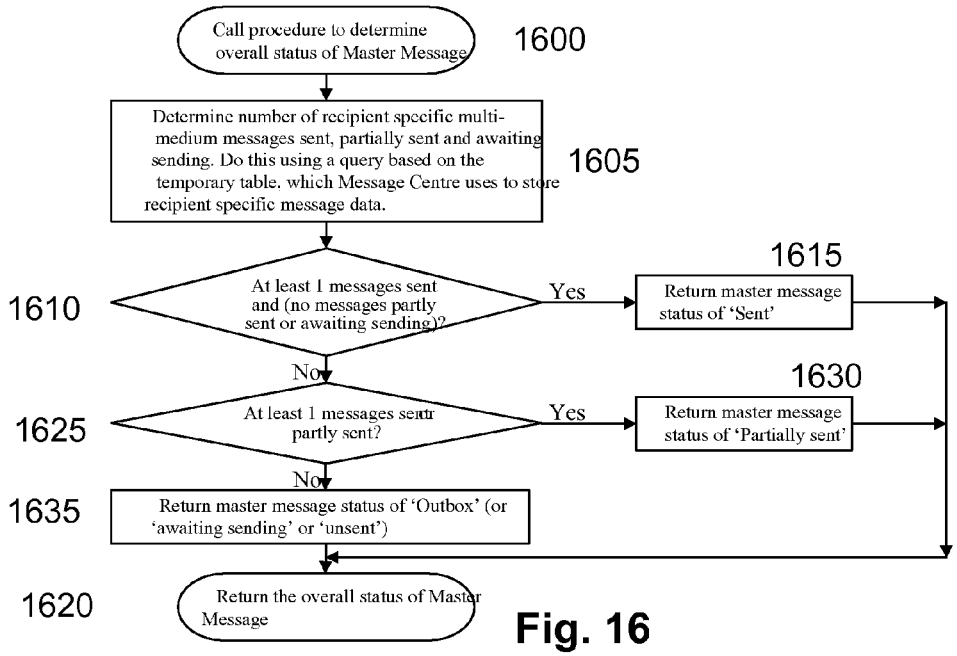
FIG. 16 is a flow chart of an example of a process for determining a message status for each master message.

The flowchart of FIG. 16 describes an example method of determining a master message status using a function referred to as 'DetermineMasterMessageStatus'. This function calculates the status of the Master Message which reflects the cumulative status of all recipient specific messages.

In this example, at step 1600 the computer system calls a procedure to determine the overall status of the master message. At step 1605 the computer system 203 determines the number of recipient specific multi-medium messages sent, partially sent and awaiting sending. This is achieved using a query based on the temporary table, which the Message Centre uses to store recipient specific message data.

At step 1610 the computer system determines if all messages are sent. If this is the case, then at step 1615, the computer system 203 returns a master message status of sent before returning the overall status to the user at step 1620.

If not all messages have been sent, then it is determined at step 1625 if at least one recipient specific message has been partially or fully sent. If this is the case, the computer system returns the master message status of partially sent at step 1630.

Otherwise the process moves onto step 1635 with the computer system returning the master message status of outbox (synonymous to 'unsent' and 'awaiting sending').

It will be appreciated that the manner in which the computer system 203 determines if a message is sent will depend on the message type. Thus, for example, if the message is an email this could include detecting that an email application has sent the email, and if a read receipt feature is available, when the receipt email is received. In contrast, successful transmission of letters and faxes (if not sent electronically) can be based on successful document creation not successful delivery. Thus, this could be determined when the letter of fax is printed or sent to the base station 201 for subsequent postal by an operative Adding Recipients To add recipients one at a time, the recipient type can be selected using contactee type controls 714, then selecting a recipient, for example, by entering details or selecting from the drop down list 713, and if necessary modifying the message mediums using the checkboxes 703. However, addition of multiple recipients can be achieved in any one of a number of manners. For example, using the add recipient buttons 708 allows individual, family and group recipients to be added.

In the case of families, use of the corresponding add recipient button 708 can automatically include all members. If not all family members are required then all can be added, with unwanted members being deleted as required.

Additionally and/or alternatively recipients car be selected by performing a search of recipient attributes, such as demographic information, membership of clubs or groups, or any other suitable information.

Use of the group add recipient button enables all group members to be added to the recipients in just one operation. Optionally only position holders (leaders) can be added by selecting the [Leaders] button (see image below). This would be useful if, for example, there was a need to invite all group leaders to a meeting. Alternatively, all members that do not hold a position in the group can be added by selecting the [Members] button (see image below). As with adding members of a family, if not all selected group members are required then simply delete any not-required members.

By default, only those who are currently a member of the group are added. This is indicated by the fact that the [Current] button is selected (depressed) by default. However it is possible to add only ex-members to the recipients list or all members, current and ex, by selecting [Ex] and [All] respectively. The [Ex] option is useful when needing to contact individuals who were once a member of a group, but are no longer. This would be the case, for example, when organising a reunion.

Figure 17:
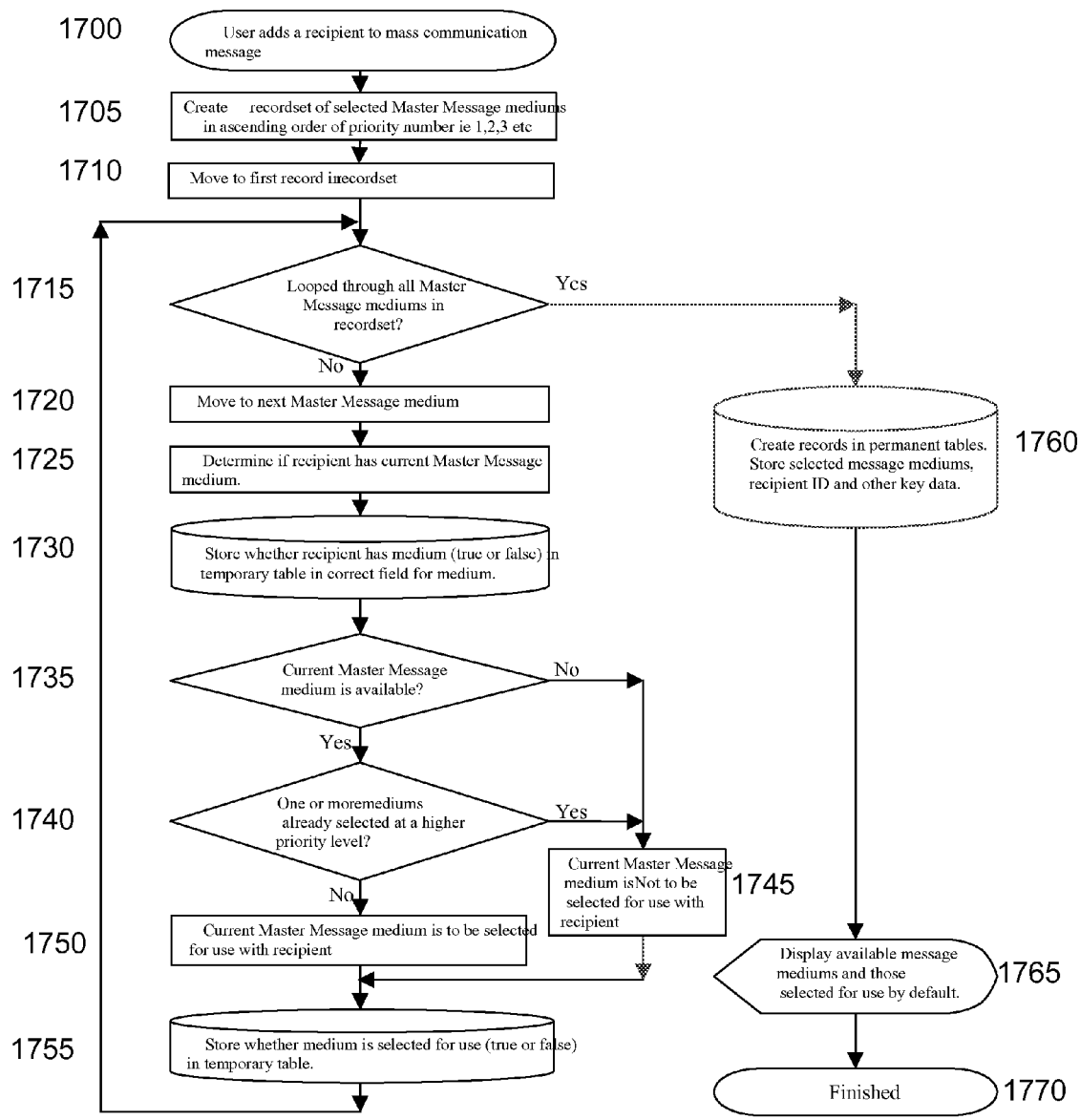
FIG. 17 is a flow chart of an example of a process for adding a recipient to a Multi-Medium, Multi-Recipient message.

For each recipient added to a Multi-Medium, Multi-Recipient message, Message Centre automatically selects the message mediums to use for the recipient, according to the mediums available to the recipient, the priorities given to message mediums in the master message and the rule to be applied. The manner in which this is achieved as part of the process for adding a recipient is described in more detail in FIG. 17.

In this example at step 1700 the user adds a recipient to the mass communication message. At step 1705 the computer system 203 creates a record set of selected master message mediums in ascending order of priority.

At step 1710 the computer system 203 moves to the first record in the recordset before assessing whether all master message mediums in the recordset have been completed at step 1715. If this is not the case, then at step 1720 the computer system 203 moves on to the next master message medium before determining if the recipient has the current master message medium available at step 1725. In this instance the computer system 203 stores an indication of whether the recipient has the medium available as a true or false indication, in a temporary table in the correct field for the associated medium at step 1730.

At step 1735 the computer system 203 determines if the current message medium is available to the recipient by examining the value in the field as per step 1730. If so, the computer system 203 moves on to step 1740 to assess whether one or more mediums already selected have a higher priority level. If the master message medium is unavailable or if a medium already selected has a higher priority level, then at step 1745 the computer system 203 determines that the current master message medium is not to be used for the selected recipient. Otherwise at step 1750 the computer system 203 designates or marks or stores the current master message medium for use with the recipient.

At step 1755 the computer system 203 stores an indication of whether the medium is selected for use in the temporary table before returning to step 1715. This process is repeated until all master message mediums in the record set have been completed at which point the process moves on to step 1760 with the computer system 203 creating records in permanent tables to store the selected message mediums, a recipient ID and other data.

At step 1765 the computer system 203 displays available message mediums and those selected for use by default before finishing at step 1770.

Thus, in this example, the computer system 203 loops through each message medium that has been assigned a non-zero priority in the master message. The message mediums are sorted in ascending order. For each Master Message medium, the application determines whether the medium is available to the recipient. When applying the Inclusive rule, the computer system selects all available message mediums at the highest priority level for which at least one medium is available. For lower priority levels, no mediums are selected.

In general, throughout the above described process, unselected mediums are not displayed on the interface. Furthermore, when in Edit Message mode, the Message Editor displays only those mediums that have been selected for the recipient.

The colour immediately surrounding the message check boxes 703 can be used to indicate their availability and send status. The same colour as the rest of the record indicates that the message medium is available for the recipient and is unsent. Other colours indicate the status of the message medium according to the following legend;

Red—error sending,
Blue—medium unavailable,
Green—sent,
Purple—message sent and reply received,
Yellow—message sent but success not yet confirmed.
Orange—problem with individualised message content.

However, any suitable colours may be used, and optionally these can be customised by the user.

Sorting Recipients

Recipients can be sorted in a number of ways including, by name, whether a specific message medium is selected for use, recipient type and message status.

This can be achieved, for example, by left clicking the label of the column that is to be sorted. Left-clicking again re-sorts the recipients in a different sort order by cycling through the possible sort orders for the column. Most columns, including the message mediums (email, fax, SMS etc) will cycle from ascending order to descending order and back again.

The contactee column has more extensive sort options than the other columns. The tool tip indicates the current sort order (top line of tooltip) and the sort order that will be applied if the column label is selected (bottom line of tooltip).

Recipients with No Mediums Available

Figure 7C:
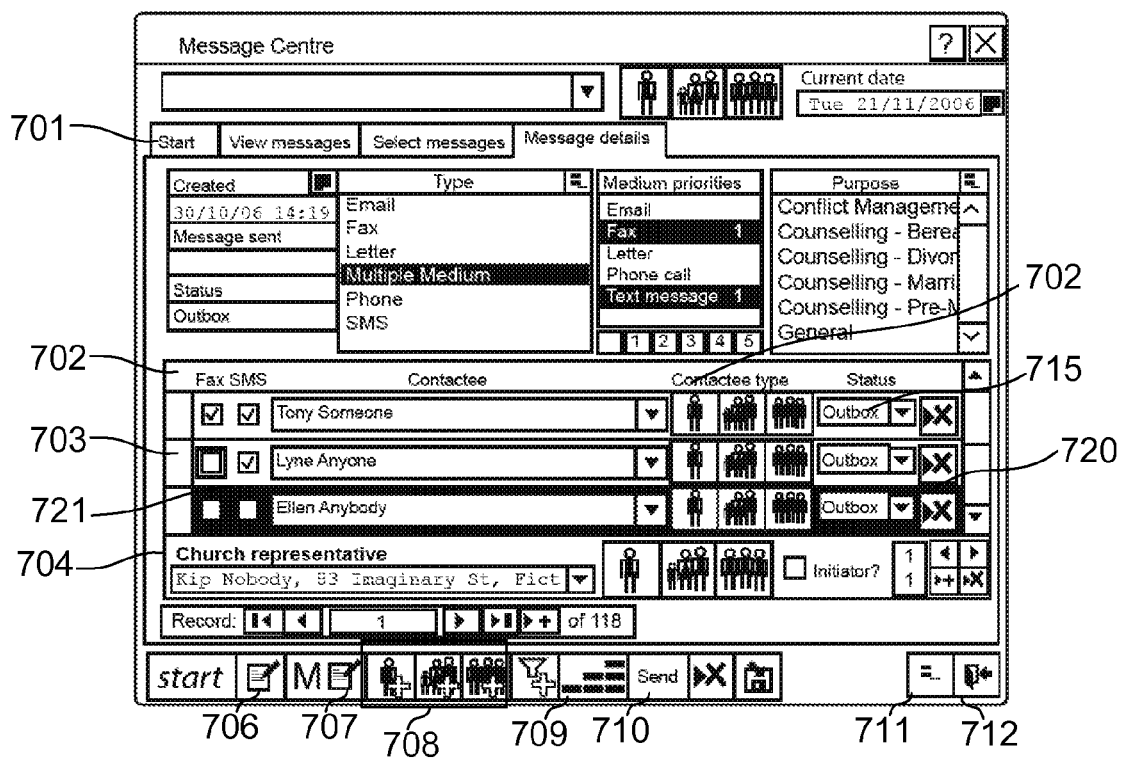

Recipients that have none of the selected message mediums have the record background shaded, as shown for example in FIG. 7C, in which the record background is shaded, as shown at 721 such as a dark blue colour. The colour used for shading can be customised.

For recipients with none of the selected message mediums there are three possible courses of action;

Select one or more additional message mediums in the hope that the affected recipients will have one of these mediums,
Delete the recipient, if it is not necessary to include them in the message,
Update the recipient's details, if the computer system 203 has determined that the mediums are unavailable and this is due to the recipients contact details being incomplete.

Deleting recipients

Delete a recipient by left-clicking the [Delete recipient] button 720. By default a message prompt will be displayed, confirming the delete. This confirmation prompt can optionally be eliminated by opening the preferences form to the Communications page and checking the option.

Once a recipient specific message has been sent or even partially sent, the recipient specific message cannot be deleted. Also, once a message of a specific medium type e.g. email has been sent, it cannot be de-selected. So if, for example, the email message has been sent to a specific recipient, then the recipient specific message can no longer be deleted, nor can the email medium be de-selected. These restrictions on deleting and de-selecting apply with the default rule being applied. Other optional rules may allow deleting and de-selecting in the same circumstances (as discussed later in this document).

Master Message Content

Master Message content is used to automatically create recipient specific messages. The content of the Master Messages determines the default, individualised message content of each recipient specific message. The computer system 203 does this by converting any placeholders in the Master text into the corresponding actual value of the recipient. So for example the placeholder [Surame] would be converted to 'Smith' for the recipient 'Bill Smith'.

The individualised message text created by default for Recipient Messages can be modified manually. This is known as 'customising' the Recipient Specific message. The customised message can then be 'locked' to prevent any future changes to the master message text overriding the manually customised message.

Master message text can be created for each medium and for each recipient type. So for example, in a message where the fax medium is selected, a separate master message can be prepared for Individuals, Families, Groups and Organisations. Only relevant Field Placeholders are made available for each recipient type. For example the [Firstname] Field Placeholder is appropriate for the Individual recipient types but not for Families, Groups or Organisations. Likewise the [MembersFullNames] Field Placeholder is only relevant to the Group recipient type.

The Master Message also determines other details such as which of the recipient's email addresses to use by default eg work, personal, family email address etc and which word processor document templates to use when generating letter and fax documents.

There are two main ways of creating Master Message content. The first way is to simply type the Master Message text and make all selections manually. This is known as 'Creating from scratch'. The second method is to use one or more, previously created, Message Templates.

The Message Templates contain text, word processor documents and other settings. One Message Template can be applied to the entire Master Message or separate Message Templates can be applied to specific message mediums and recipient types as required. Once a Message Template has been applied, the master message can be modified as required or left as it is.

Selecting a Message Template

Selecting the [Templates] button 904 on the Message editor interface shown in FIG. 9, places the Message Editor into 'Message Templates' configuration. In addition, the tab control which allows selection of message mediums is disabled. This prevents any editing of message content until the form is returned to the standard edit master message configuration. With the Message editor in Templates configuration the user can select and apply a pre-defined message template, open the Message Template manager (which allows creation, duplication, editing and deletion of message templates) or save the current message as a message template.

The user can then select a pre-defined message template, using the select template option, which places the Message Editor into Select Template configuration as discussed above.

Using the [Template] drop down control is the quickest way of selecting a template but it relies on the user being familiar with the available templates. The Template Selector allows available message templates to be fully examined before selecting.

Once a message template is selected it must be applied to the master message. The template can be applied to the entire message, just the current message medium (all Recipient types), just the current Recipient type (all message mediums) or just the current message medium and current Recipient type.

For example, say there is a Church known as 'Church on the Coast'. The leadership of this Church like to welcome new Church members using a Recipient Message based on the 'Welcome to Church on the Coast' template. This template has wording that has been refined over time and uses the latest letter and fax document templates that feature the current Church logo. The template has been configured for all message mediums and all Recipient types. By using the Message Template they avoid embarrassing errors (that are more likely to occur in a newly created document), ensure new members are presented with the most polished and welcoming image of the Church and do all this with very little time and effort. For any often-repeated correspondence, a message template should be prepared to make preparing a message simple and efficient. Church on the Coast creates a new message, based on the 'Welcome to Church on the Coast' template, each Tuesday morning and sends it to all new Church members from the previous weekend. Because of this practice, all new members promptly receive a polished, effective welcome to the Church, increasing the likelihood of them returning.

In another example, a letter is to be sent to all members of the management committee. The letter requires urgent attention and must be signed and returned ASAP. In this case two message templates are used. First the 'Urgent attention' message template is applied to all message mediums and all Recipient types. Next the 'Internal business' message template is applied to just the letter message medium. This way all members of the management committee receive text messages, emails, phone calls and faxes that emphasize the urgency of the matter. They then receive the letter, which is formatted according to the standard for internal business.

Editing a Master Message

An example of editing a master message will now be described with respect to an SMS specific example.

In this example, the Master Message is composed in the [Text message text] control 903. The message can include field placeholders 903a.

When writing an SMS master message, care must be taken to ensure that the length of the master message does not exceed the maximum message length (160 characters at time of writing). The [Number of character] controls 922 help by displaying how many characters have been used in the message and how many are still available.

To ensure that most, if not all, the individualised messages do not go over-length, allow a small safety margin of unused characters in the master message. Using say 20 characters (some experimentation with this number is advisable) less than the total available, in the master message, should help ensure that there, most, if not all, individualised messages are within the character limit. If messages are over-length, either the master message can be edited to a shorter length and/or recipient messages can be customised.

Editing for other mediums is similar and will not therefore be described in further detail.

Individualising Message Content

Individualising is the process of modifying the content of the master message and making it correct for a specific recipient. Field placeholders are replaced with their actual values. Symbolic values of phone numbers, addresses etc are replaced with the equivalent actual values of the specific recipient. In other words the generic master message is converted into a recipient specific message.

Whenever messages are viewed or sent, Message Centre checks to see whether the message content of that specific message medium and recipient needs to be individualised. The criteria that are considered include:

1. Recipient message is locked to further updates.
2. Recipient message has never been individualised.
3. Master message has been updated after corresponding recipient message was last individualised.

In this example, if criterion 1 is true, then the message content is not updated. If criterion 1 is false then the message content is individualised if criterion 2 or 3 are true. In one example, updates for some components of the message, for example phone numbers, addresses etc will never be locked against updating, even if the message itself is locked. This is to ensure that the latest contact details are always used.

Customising Message Content

Figure 18:
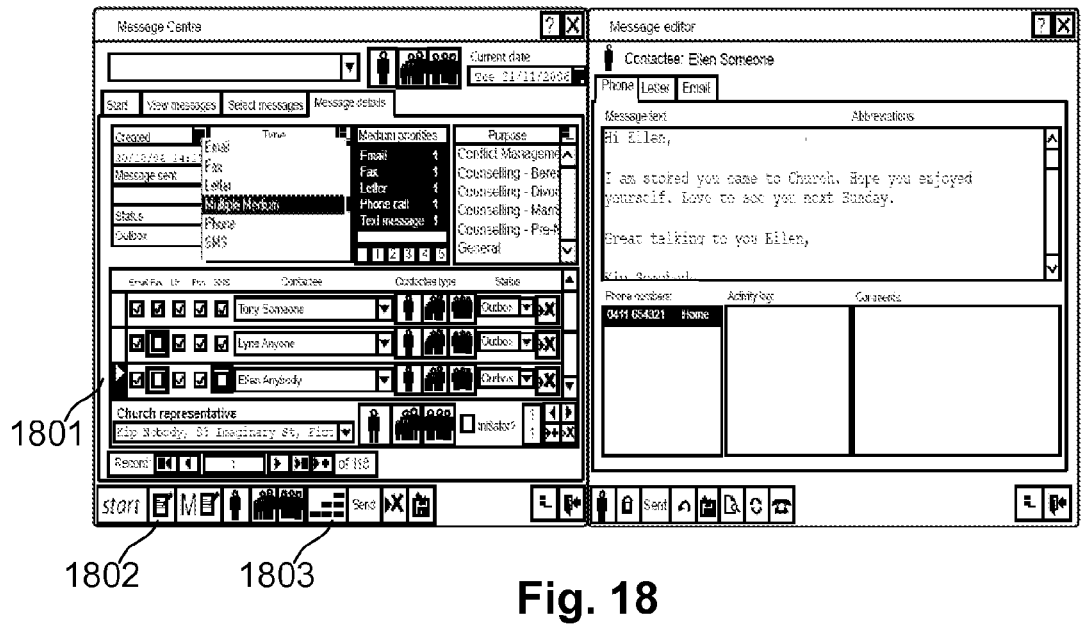
FIG. 18 is a screen shots of an example of a message editor interface in edit message mode.

Message content can be customised using the message editor when placed in edit message mode, which allows editing and viewing of the individualised message content of recipients. To achieve this, the message editor interface is placed in edit message mode, as shown for example in FIG. 18. This is achieved by selecting the [Edit message content button] 1802 on the Message Centre interface, or double clicking on the record selector 1801 of the desired recipient.

If messages to specific recipients are to be individually customised it can be convenient to have the Message Centre and the Message Editor open side by side as shown. This makes it very easy to move between recipients, simply click on the record selector 1801 of the required recipient. As soon as the recipient is selected, the Message Editor is updated with the message content of the recipient. The selected recipient's message content is ready to be viewed and edited.

Repeatedly selecting (left clicking) the [Display contactees] toggle button 1803 cycles between displaying 1, 3 and a full form of recipients.

Customising an SMS Message

Figure 19:
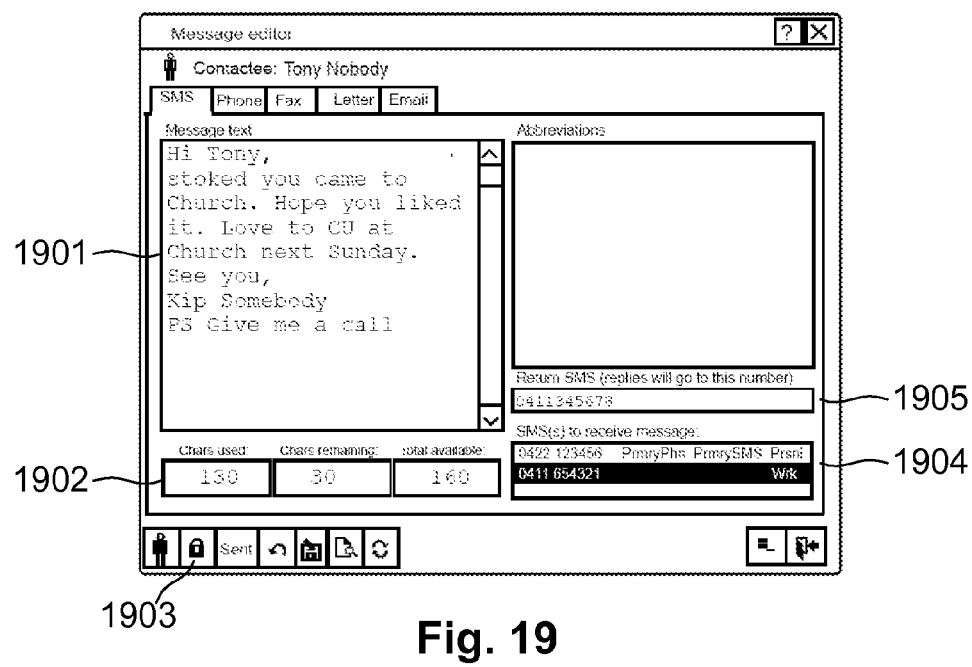
FIG. 19 is a screen shots of an example of a message editor interface used for customising an SMS message.

For the purpose of customising an SMS message an interface similar to that shown in FIG. 19 is used. In this example, the interface includes:

Message text 1901. Displays the actual message that the recipient will be sent.

Number of character controls 1902. These controls, help the user make full use of the number of characters available whilst keeping the message to an acceptable length. Text must fit within a single message ie spanning across multiple messages is not permitted at present.

Lock button 1903. Prevents (if depressed) or permits (if raised) editing of the text message.

Recipient SMS number 1904. Displays the mobile phone number to which the message will be sent. The text to the right of the phone number indicate that the highlighted number is nominated as the Primary phone of the recipient and the Primary number to use for receiving Text messages.

Return SMS number 1905. The number to which any recipient replies will be sent. So if a recipient receives a text message and replies to it, the reply text message will be sent to the Return SMS number.

The actual mobile phone number(s) of the recipient are displayed in the [Recipient SMS number] control 1904. The recipient's number which matches the symbolic value in the Master message (eg Primary SMS number), is selected by default. If the recipient has multiple phone numbers capable of receiving SMS messages, then a different one can be chosen. So for example, the mobile phone selected by default may be the recipient's personal mobile phone. For the message in this example it may be more appropriate to use the recipient's work mobile phone. To do this the user would simply select it from the [Recipient SMS number] control 1904.

The contents of the SMS message can be customised. So for example if a specific recipient should receive say, a message of thanks at the end of the text, this can be added. In the image to the right the text 'PS Give me a call' has been added to the individualised message which was created by default. Note that the [Lock] 1903 button is depressed, indicating that the message is locked and will not be affected by any future changes to the master SMS message.

It will be appreciated that customisation of other messages can also be achieved in a similar manner using other appropriate interfaces.

Sending a Message

Selecting to send a message results in an attempt being made to send all separate messages, to all recipients. Depending on the message mediums selected in the Master Message, emails and text messages are sent, letter and fax mail merges are generated and displayed in the word processor ready for printing. The result (success, failure/error) of the attempt to send each separate message is stored and displayed on the recipient specific message.

Phone call messages typically must be performed at least partially manually, with the message centre interface displaying an outline of the call to prompt the user when the call is being made, as well as to supply a phone number. In this example, once a phone call is completed the user can indicate this is completed manually, for example by selecting a complete option, with the phone call being displayed as sent.

Each message that is sent is recorded as sent and its content is irreversibly locked. It can still be displayed but can't be edited. Note that only un-sent messages are sent, previously sent messages are not sent again.

Figure 20:
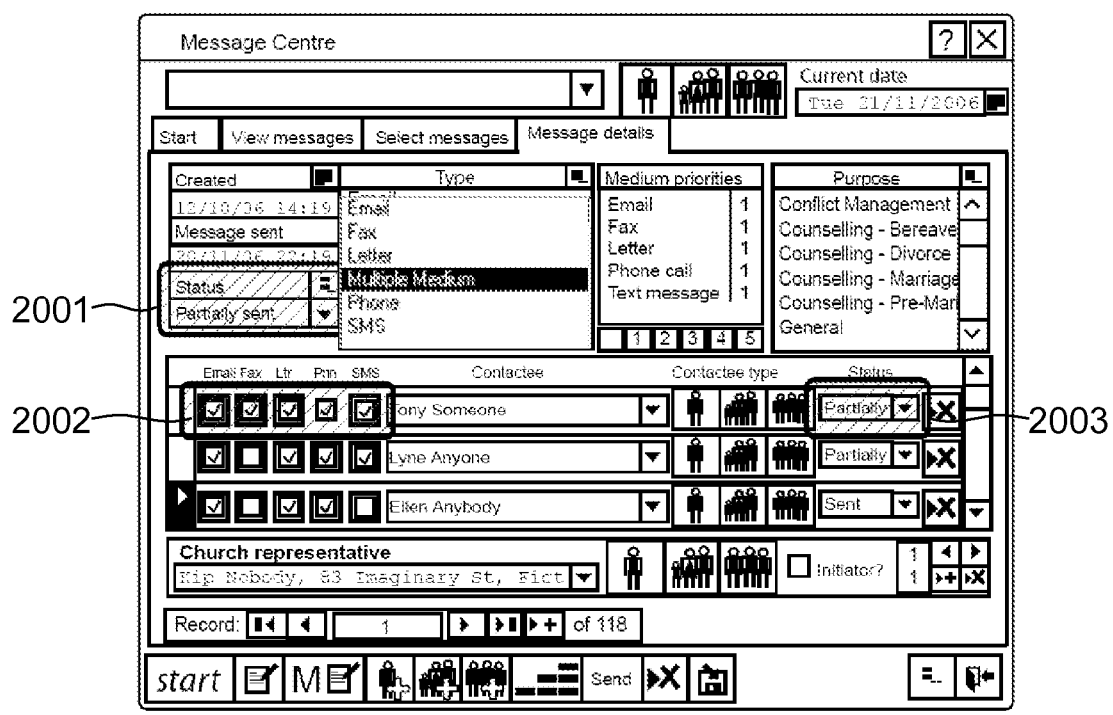
FIG. 20 is a screen shot of an example of an interface used to review the status of messages.

The appearance of the interface during the sending of a message is as shown in FIG. 20. In this example, the interface includes the following major features:

Master Message status control 2001. Displays the status of the Master Message.

Message status controls 2002. The colour of the square surrounding a checkbox indicates the status of a specific message of a specific recipient.

Recipient message status 2003. Displays the status of the Recipient Message i.e. the combination of messages to a specific recipient eg sent, partially sent, outbox etc The status of each recipient specific multi-medium message (ie the combination of all messages selected for the recipient) is recalculated eg sent, partially sent, outbox etc and the [Recipient message status] control 2003 is updated to display the new status.

The status of the message for each specific medium for each recipient specific message is recalculated and the display is updated i.e. the colour of the square surrounding the corresponding message medium is changed to reflect that the message is sent (green), experienced errors (red) etc.

The status of the master message is calculated and displayed in the [Master Message status] control. If all messages for all recipients are sent, the status will be Sent. If some but not all messages are sent, the Master Message status will be "Partially sent" even if just one message for one recipient is unsent.

Changes can also be made to the message editor interface upon sending a message. For example, once a message has been sent, its content is locked. The message can still be viewed, previewed and the mail merge document opened (if a fax or letter message) but the content cannot be changed in any way.

Figure 25:
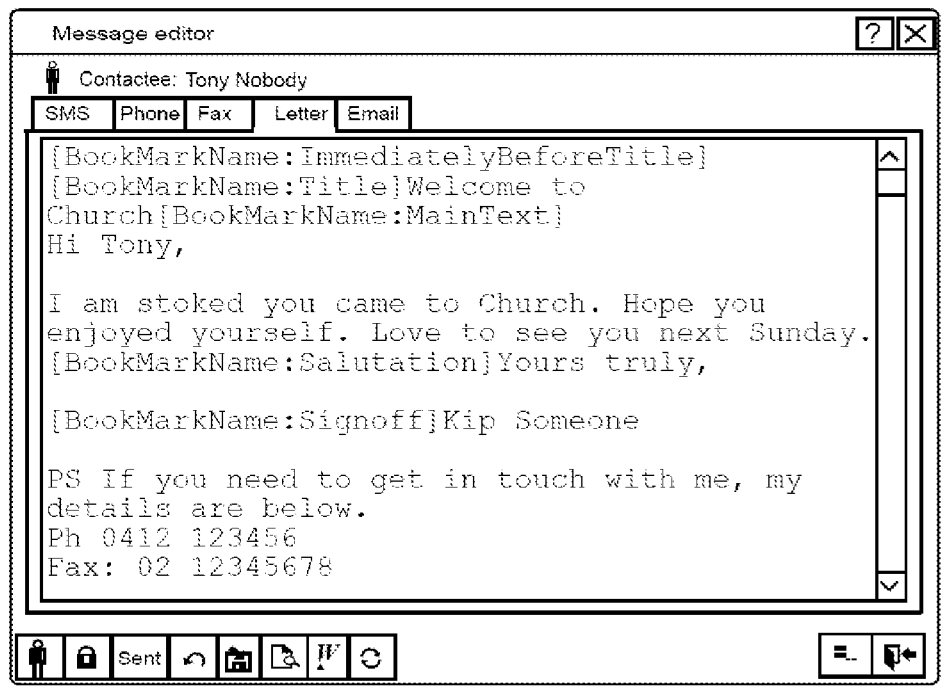
FIG. 25 is screen shot of an example of an interface displaying message content of a message that has been sent.

Of the footer command buttons in FIG. 25, which are related to the specific message on display, only the [Individual details], [Preview] and [Edit document] (displayed for fax and letter mediums only) buttons are enabled (able to be used). All the other buttons have been disabled, as indicated by their greyed out appearance.

In addition, the main text control has been locked, as indicated by the grey colour of text, compared to the usual black colour. The full message text can be viewed but not edited.

The default rule is that messages cannot be deleted once one or more components of the message have been sent. So partially sent or fully sent recipient specific messages cannot be deleted. Likewise partially sent or fully sent master messages cannot be deleted. However, deletion of sent and partially sent messages may optionally be permitted according to the value of related preference settings, whether the current user is the author of the message and the access security level of the user.

Figure 26:
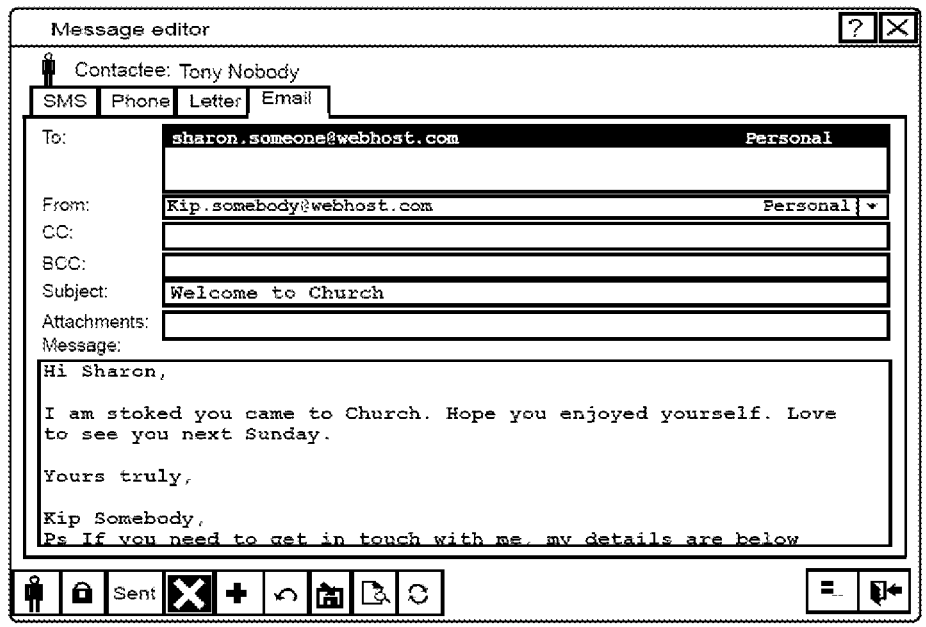
FIG. 26 is a screen shot of an example of an interface displaying message content of a message that has errors; and, FIG. 27 is a screen shot of an example of an interface displaying the error description for a message that has errors.
Figure 27:
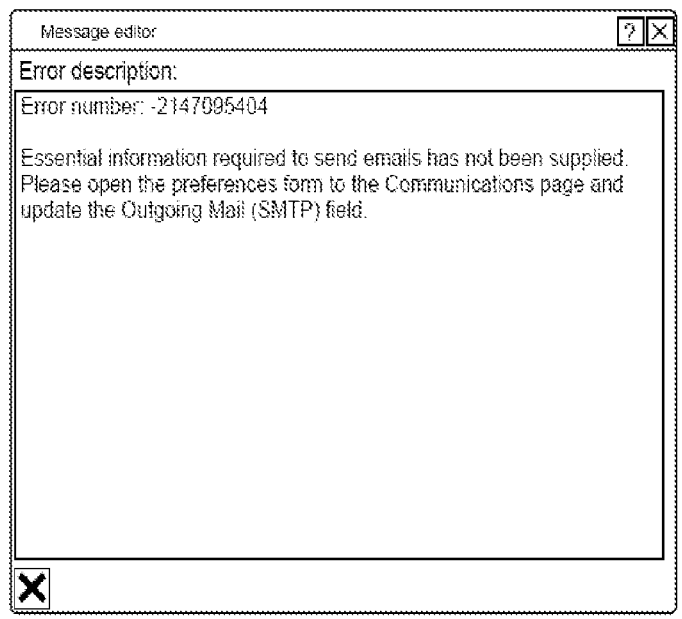

Any errors that occur when sending messages are displayed in several ways. First, a coloured square (by default red) surrounds the medium that has the error 2002. Additionally the Message Editor an error toggle button (see FIG. 26) indicates that there is an error. This button is not visible unless there is an error. Selecting the error button reveals details of the error (see FIG. 27), which can help to resolve the error. Select the error button again to return to the standard message display.

Errors may occur for any one of a number of reasons, such as because recipients have been deleted after message was originally sent, because a communications device such as a phone or fax machine is not functioning correctly, an Internet or other network connection is not functioning, or the like.

Errors may be dealt within any one of a number of manners, depending on the nature of the error. This could include, for example, repeating the send process until a medium is again available, by allowing the user to select a new message medium, or the like. It will be appreciated that this may depend on the preferred implementation.

Figure 21:
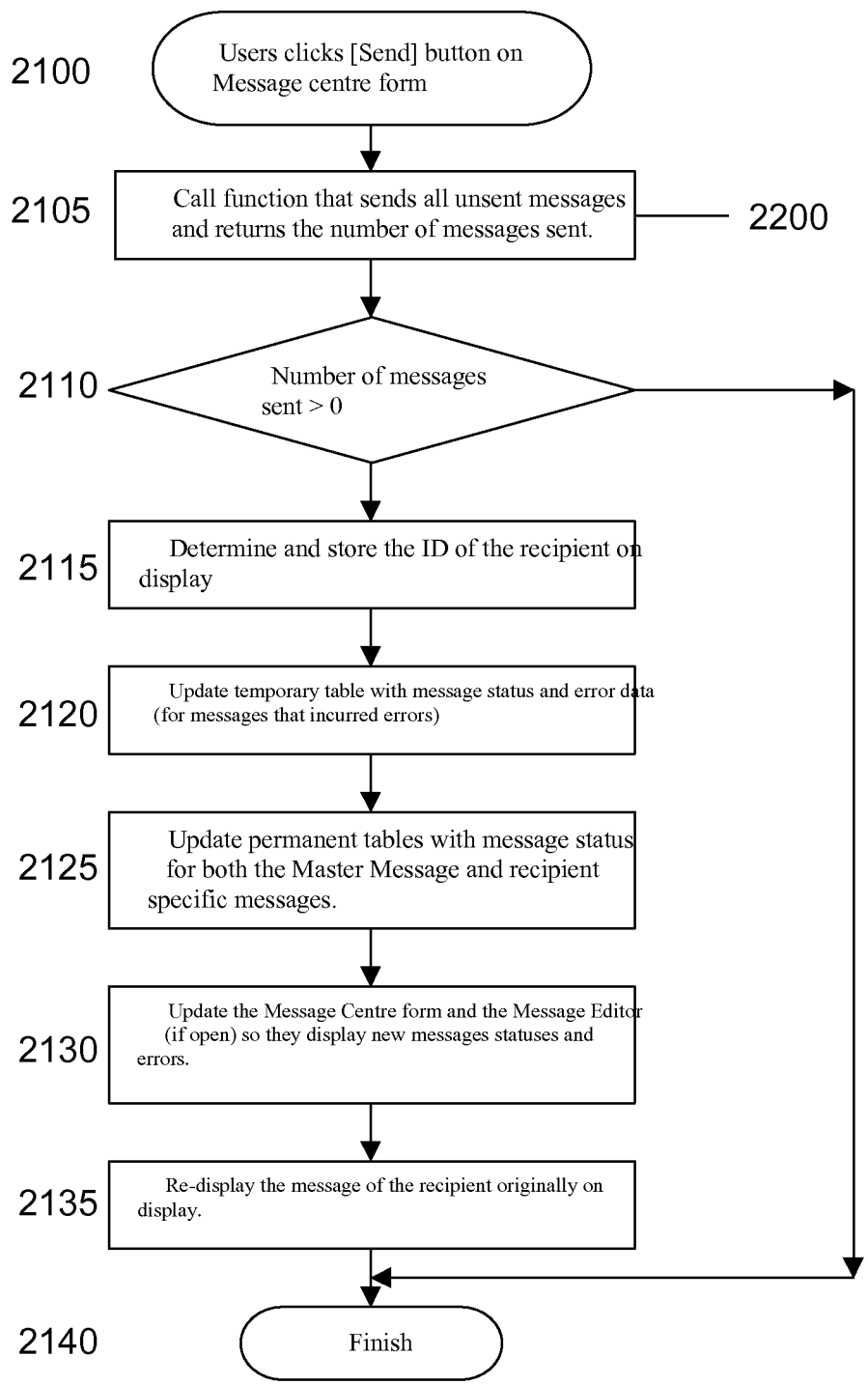
FIG. 21 is a flow chart of an outline example of the process of sending a message.
Figure 22:
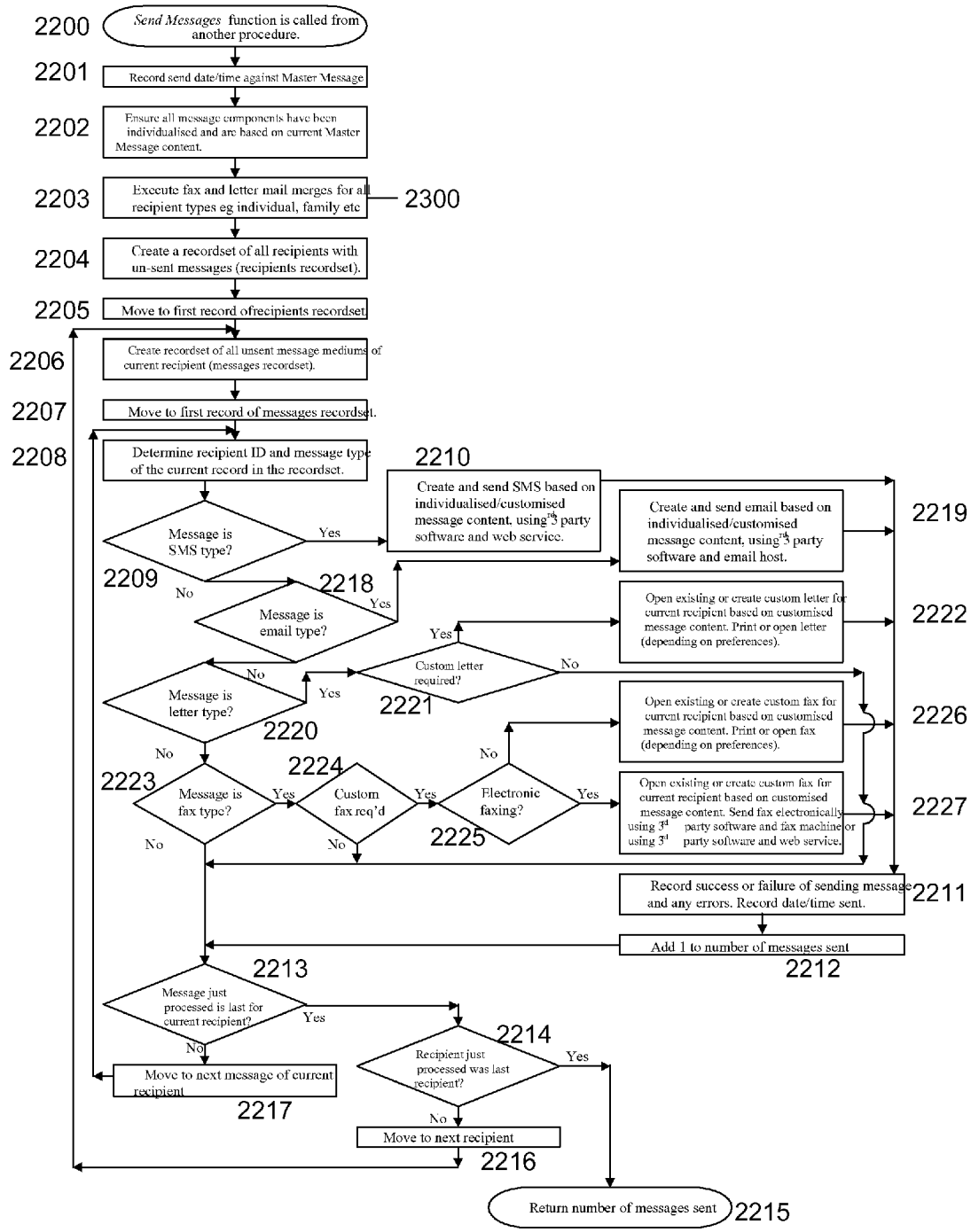
FIG. 22 is a flow chart of a detailed example of the process of sending a message.
Figure 23:
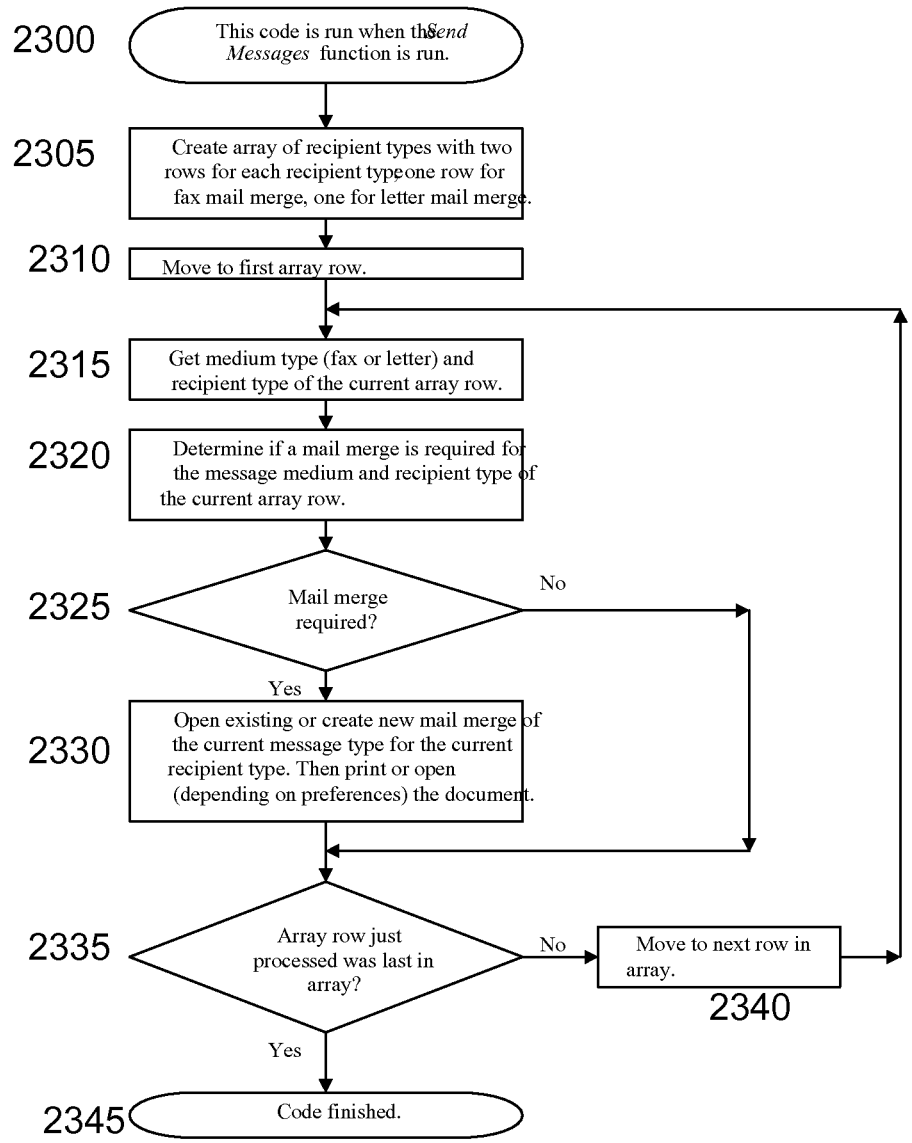
FIG. 23 is a flow chart of an example of the process of performing a mail merge during the sending of a message.

An example of the process of sending a message, including updating the interface to display the new status of messages once the send process is complete and permanently storing all relevant data, such as results of the send process, is outlined in overview in FIG. 21. FIG. 22 describes in detail the processes involved in generating and sending/previewing/printing all messages for all recipients and mediums. An example of the process of performing a mail merge, which may be used during the send process is also described in FIG. 23.

In this example at step 2100 the user clicks on a send button on the Message Centre form (Message Centre interface) which causes the computer system 203 to call a function that sends all unsent messages and returns the number of messages sent at step 2105. The manner in which this function is implemented will be described in more detail below with respect to FIG. 22.

At step 2110 the computer system 203 determines if the number of messages sent is greater than zero and if so moves on to step 2115 to determine and store the ID of the recipient currently on the display. At step 2120 the processing system 203 operates to update a temporary table with the message status for all recipients and any error data generated for messages that incurred errors. At step 2125 the computer system 203 updates permanent tables with the message status for both the master message and recipient specific messages before updating the message centre interface and the message editor (if open) so they display new message statuses and errors at step 2130. At step 2135 the message of the recipient is redisplayed with the process finishing at step 2140.

In the event that the number of messages sent is not greater than zero the process moves directly from step 2110 to step 2140.

The process for implementing the function at step 2105 will now be described in more detail with respect to FIG. 22. In this example, the send messages function is called at step 2200. At step 2201 the send date and time is recorded against the master message.

Following this at step 2202 the computer system 203 ensures all message components (excepting those of locked or sent messages) have been individualised and are based on the current master message contact. The computer system 203 then executes fax and letter mail merges for all recipient types including individuals, families, groups etc. This process is described in more detail with respect to FIG. 23.

At step 2204 a record set is stored by the computer system of all recipients with unsent messages. The computer system 203 then moves on to step 2205 moving to the first record of recipients in the record set.

At step 2206 the computer system 203 creates a recordset of all unsent message mediums of the current recipient before moving on to the first record of messages in the record set at step 2207. The computer system 203 then determines the recipient ID and message type of the current record in the record status step 2208 before determining if the message is an SMS at step 2209.

In the event that the message is an SMS at step 2210 the computer system 203 creates and sends an SMS based on the individualised customised message content using a suitable technique. In the current example this is achieved using third party software which communicates with the base station 201 to allow the message to be transferred. However, any suitable technique may be used.

Following transfer of the SMS at step 2211 the computer system 203 records success or failure of the message sending and records the date and the time sent together with any errors. The number of messages sent is then increased by one at step 2212 with the process moving on to step 2213 to determine if the message processed is the last for the current recipient. If this is the case then it is determined at step 2214 if the recipient is the last recipient in which case the process moves on to 2215 to return the number of messages sent.

If the recipient is not the last recipient the process moves on to step 2216 to select the next recipient before returning to step 2206. Otherwise if the message processed is not the last message for the current recipient step 2213 then at step 2217 computer system 203 moves to the next message of the current recipient before returning to step 2208. It will be appreciated that this process is repeated until the messages for all mediums selected for the current recipient have been sent.

In any event, if it is determined that the message is not an SMS message, the process moves on to step 2218 to assess if the message is an e-mail message. If so then the computer system 203 creates and sends an e-mail based on the individualised customised message contact. Again this may be achieved in any one of a number of ways, such as by using third party software and a corresponding e-mail host.

Following this the process returns to step 2211 to record the success or failure of the message transfer.

If it is determined that the message is not an e-mail at step 2218 the process moves on to step 2220 to determine if the message is a letter. If so, at step 2221 the computer system 203 determines if a customised letter is required and if so opens or creates an existing custom letter at step 2222. Following this, the letter can be printed, to allow subsequent delivery via the postal network, or otherwise delivered, with a success or failure of delivery being recorded at step 2211. In the event that a customer letter is not required the process returns to step 2213.

If the message is not a letter type, then at step 2223 the computer system 203 determines if the message is a fax type. If this is the case, again it is assessed if a custom fax is required and if so the process moves on to step 2225 to determine if electronic faxing should be used. If electronic faxing should not be used then at step 2226 the computer system 203 opens an existing or creates a custom fax document for the current recipient based on customised message contact. This fax can then be printed, or otherwise made available for faxing. In the event that electronic faxing is to be used, then at step 2227 the computer system 203 opens or creates the existing fax and then sends this electronically either using third party software and the fax machine 411, or third party software and services provided by the base station 201. If custom faxing is not required then the process returns to 2213.

Although not shown, in the case of a phone call, the computer system 203 can cause a script and phone number to be displayed, thereby allowing an operative to make a phone call as required. In addition the computer system 203 can cause additional controls to be displayed that allow the operative to record success and details of failed attempts including date/time of attempts to phone, types of failure including no answer, engaged or answering service and any notes regarding any attempts and successful phone calls.

In this example at step 2203 the computer system activates the process 2300 as shown in FIG. 22.

At step 2305 the computer system 203 creates an array of recipient types with 2 rows for each recipient type. This includes one row for fax mail merge and one for letter mail merge.

At step 2310 the computer system 203 moves to the first array row before operating to obtain a medium type such as fax or letter, and recipient type for the current array row at step 2315. At step 2320 the computer system 203 determines if a mail merge is required.

If it is determined that a mail merge is required at step 2325 the process moves on to step 2330 to open existing or create new mail merge of the current message type. This will be performed utilising techniques known to those skilled in the art and this will not therefore be described in any detail.

Once this has been completed, at step 2335 the computer system 203 determines if the array row just processed was the last in the array. If not the process moves on to step 2340 to move to the next row in the array. This process is then repeated until the last array row is reached at which point the process ends at step 2345.

Apparently Successful Messages

With some messages it is not possible to know immediately whether they were sent successfully. For instance with both email and SMS messages a web service may be involved. There is some delay before the server can advise whether the process was successful. In some cases the email may not be able to be delivered, perhaps due to the address being incorrect, or the like.

For such communications, an indication, such as the use of a yellow colouration for the check boxes 703 can be used. This indicates that the computer system 203 determines that the message is sent successfully, but that receipt has not been confirmed.

Once success or failure is confirmed the message status control (rectangle around the checkbox) will be coloured accordingly ie green for success, red for failure.

Reporting on Sent Messages

The computer system 203 can be arranged to record details of all communications, including successful, failed or unsent communications.

This allows a user to perform a search to review sent messages. This search can be performed using any suitable criteria. Thus for example, the search can be on an individual, family, group or organisation, such that all relevant records can be returned in an intuitive manner, without the user having to explicitly request all related records. So if a search is done on an individual, then any messages sent to the family of which he/she is a member will be displayed. Similarly any messages sent to a group or organisation of which he/she was a member at the time will also be included. The selection process includes all messages that were sent directly to the individual or to a family, group or organisation of which the individual was a member. An option 'Only include messages explicitly sent to selected recipient type' would optionally restrict the result to just messages sent explicitly to the individual.

In a similar way, selecting a specific family could return all messages that were sent to the family explicitly, or optionally, to any members of the family. Similar for groups and organisations.

Messages can be viewed as mass messages or as one of perhaps numerous individual messages sent to a recipient. When viewing message as a recipient specific multi-medium message, the user can choose to view the mass multi-medium message to see the message in its original context.

When searching for messages sent to a recipient the rules below are observed.

If message type is Multi-Medium then any Multi-Medium record of which the individual was a recipient will be included in the result. It would be displayed as a multi-medium message. If the Multi-Recipient Multi-Medium message is viewed in detail then the recipient searched on will be either be positioned at the top/visible part of the recipients list OR the searched for recipient will be the only one to be displayed. Optionally the user will be able to display all recipients.

If message type is of one of the single medium type eg email, then in addition to all email messages being displayed, any multi-medium messages for which that single medium message was selected, will also be included. So if searching for messages of type email, any multi-medium messages for which email was selected would also be included in the result list. They would be displayed as multi-medium messages.

Figure 24:
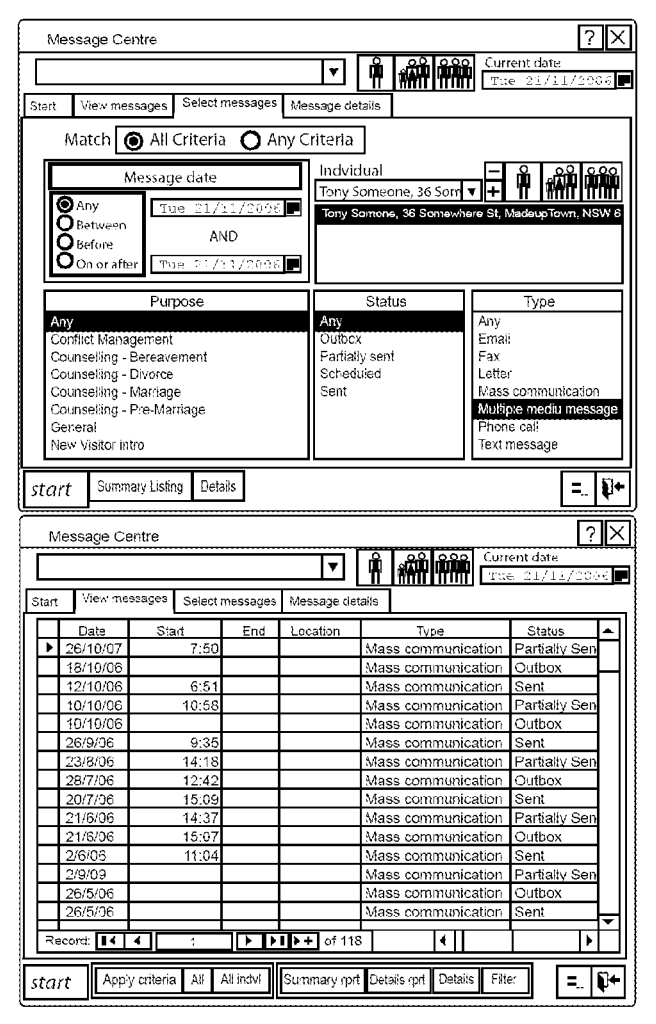

An example of the interface that can be used in performing the search is shown in FIG. 24.

Handling Problems with Message Content.

Messages that have problems or potential problems related to their content can be identified to the user in a similar manner to the way errors are displayed to the user. Thus, for example, a rectangle surrounding the relevant medium check box (say orange in colour) and a Content Problem toggle button in the footer of the Message Editor form can be displayed when there is a problem with the content. When the Content Problem toggle button is selected, a description of the problem can be made visible, thereby ensuring the user is notified of the problem and assisted in its resolution. An example of this would include SMS messages which exceed the maximum permissible length.

Examples of the manner in which problems may be handled will now be described.

Intelligent placeholders—have a fail safe value for placeholders. So for example if the placeholder [Parent] is used and a particular family doesn't have any defined parents then the fail safe value may be "parent or guardian". Such failsafe placeholder values ensure that a message always makes sense.

Alternative message content—For Master Messages and Template Messages this enables the creation of any number of alternative message content. These alternative messages (actually alternative content) can be related to placeholder values. So for example the default message would be used except when placeholder [Parent] was empty in which case Alternative content #1 would be used. If both [Parent] and [SelectedMembers] placeholders were empty then Alternative content #2 would be used and so on. Defining the combinations of placeholder values that trigger use of alternative messages could be defined centrally for all message mediums and all entity types. Where an alternative message was not defined for a specific entity type and message medium, the default content would be used. In addition to the centrally placeholder values, there could be custom definitions for specific mediums and or recipient types. Alternative message content can be used to ensure that messages always look professional and make sense.

Additional Features

A number of further features will now be described.

Enabling message medium priorities to be saved with message templates. This is of benefit because it allows the decision about most suitable mediums for a specific medium to be decided once and then reapplied whenever the template is used. These default message medium priorities can be overridden.

Enabling receiving of email. Any email replies from recipients can be received using an email client such as MS Outlook, MS Outlook Express etc or by some other means. The content of these replies can be imported, allowing the replies to be displayed alongside a sent message automatically. The user can be alerted to the existence of a reply email by the colouring of the medium select check box for each recipient. When a message is sent the box is coloured green. When a reply is received, the colour could change or another means could be used to signify that a message was received, such as a second, larger surrounding rectangle. The user can then view the reply by selecting the recipient in the message centre form and then selecting the Email tab on the content form. The user can then alternate between viewing either the sent message or the replies or both.

Enabling creation of email mail merges in a similar manner to the letter and fax mail merges. Microsoft Outlook™ or another email client could be used to create nicely formatted, individualised emails in HTML or plain text. This is different to simply sending an email to multiple recipients since each email is individualised and can be further customised.

Enabling receiving of SMS replies in a manner similar to receiving of email.

Enabling receiving of fax replies in a manner similar receiving of email. In this instance the computer system can advise of received faxes and enable viewing them in similar way to received emails. Due to the fact that fax data is non textual, faxes may need to go to a common inbox/retrieval area and be manually related to a message and recipient.

Enable recording of received phone calls in reply to a specific message.

Text messaging dictionary of common abbreviations with a customisable dictionary. This would allow, for example, common SMS abbreviations to automatically replace the corresponding full words or expressions. Alternatively the dictionary could be used to indicate words and expressions with a corresponding abbreviation and make it quick and convenient to replace the full text with the corresponding abbreviation.

Preferred To address, SMS number etc. In the above example, the message medium availability for recipients is determined based on whether they have the medium or not. However if the user refines the master message to require a specific set of contact details, such as a Home email address ie location type of 'home' (as opposed to work or personal email address etc) then this could be used to decide that the user doesn't have access to the email medium if they don't have an email of location type 'home'. Instead of a dark blue rectangle (indicating unavailability of medium) around the email check box, there could be a different colour, say orange, indicating that medium is available but doesn't meet precise requirements. The user can then select this recipient and medium to customise the recipient's message to accept an available email location type. In one example, an 'Insist on specific To location' can be used to force use of a specific address type, whereas if this is not selected then the Home location type would be treated as a 'preferred' location type. So an email of Home location type would be selected, if available, otherwise the primary email address would be selected.

The address fields in other mediums, eg SMS to receive message, would be treated in a similar manner.

Definitions

In this document the name 'Message Centre' is used to refer to the combination of application components, that collectively, enable the creation, sending, searching and viewing of messages. When the specific 'Message Centre' form is being referred to, the form will be referred to as 'Message Centre form'.

In this document the terms 'contactee' and 'recipient' have equal meaning and are used interchangeably. Recipients are individuals, families, groups or organisations (organisations have not been implemented yet) that are selected to be sent a message. If a recipient is an individual it is said to be of the 'Individual' recipient type. In a similar way, if a recipient is a family, the recipient is said to be of the 'Family' recipient type and similar for groups and organisations. Recipient types, including their benefits, are described in more detail in the "Recipient Types" section above.

In this document the phrases "recipient type" and "entity type" are equivalent and are used interchangeably.

In this document the phrases "communications medium" and "message medium" are equivalent and are used interchangeably.

Entity—used to refer to an individual, family, group or organisation.

Single-Medium message—a message that uses only one communications medium eg fax or email or letter etc.

Multi-Medium message—a message that uses multiple communications mediums eg fax and email and letter etc.

Single-Recipient message—a message that has only one recipient.

Multi-Recipient message—a message that can have multiple recipients.

Two key concepts discussed in this document, which are relevant to the Message Centre are Master Messages and Recipient Specific Messages.

Master Message—applies only to Multi-Recipient messages. It defines the overriding properties of the message including, the message sender, the default message content and the message recipients. For Multi-Medium Multi-Recipient messages only, the Master Message also defines which communications mediums may be used and their priorities.

Recipient Specific Multi-Medium Message (usually referred to as simply 'Recipient Message' or 'Recipient Specific Message')—One is created for each recipient added to the Master Message. The Recipient Message stores the recipient, recipient type, message medium selections (i.e. which message mediums are to be used) and individualised message content for each selected message medium.

Primary Organisation—the organisation to which the individuals, families and groups belong. The Primary Organisation uses Message Centre to store details of individuals, families and groups and record membership of the Primary Organisation. These details are used by Message Centre in automating communications.

External Organisation (usually referred to as simply 'Organisation')—Bodies external to the primary organisation eg businesses, government departments, charities, Churches, Schools, libraries etc Group—This is a generic term for a collection of people (other than a family). It can be any recognised association of specific people with each other, both formally defined and informal. For example work units, sections, branches etc could be treated as groups as could individuals with common interests, skills, geographic locations etc.

Field Placeholder—Used in the message text of Master Messages and Message Templates. A placeholder is a, Message Centre defined, word or phrase, surrounded in square brackets that represents an attribute of an individual, family, group or organisation. Placeholders are used in the construction of the Master Message and are converted to actual values for each recipient, when the recipient specific message is edited or sent. For example, [Surname] is converted to the actual surname of each recipient when the Recipient Message is edited or the message is sent. As another example [MembersFullNames] would be converted to the full names (separated by commas) of each current member of each recipient of type group.

Bookmark Placeholder—Used in the message text of Master Messages and Message Templates. Bookmark placeholders allow the precise positioning of text in the word processor document, and the precise formatting of that text. Each Bookmark Placeholder must correspond to a pre-defined bookmark in the word processor document.

The term "processing system" is intended to encompass any form of processing system, such as a computer system, server or the like, which is capable of being used to implement one or more aspects of the above described process.

Individualise—the process of converting placeholders to actual values. The same term is used whether a recipient is of type individual, family, group, organisation or some other type of entity.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A method of transferring content to a number of recipients via multiple independent communications mediums, the method including, in a processing system:
   a) causing a user interface to be displayed including a list of a plurality of recipients each being at least one of an individual, family, group and organization having associated contact details, the contact details including at least one of an address and contact number;
   b) selecting the number of recipients from the list;
   c) selecting at least one communications medium for each of the number of recipients, the communications medium being selected based on the contact details of each of the number of recipients and wherein a plurality of different communications mediums are selected for at least one of the recipients;
   d) determining the content to be transferred by:
      i) determining master content; and,
      ii) for each selected recipient modifying the master content, wherein the master content includes at least one placeholder, and wherein the method includes, in the processing system, replacing the placeholder with a value selected based on a recipient attribute to thereby generate respective content for each of the selected plurality of different communications mediums and each of the number of recipients so that the content is different for at least two of the selected plurality of different communications mediums and at least two of the selected recipients; and
   e) transferring the respective content to each of the number of recipients using the selected communications mediums.

2. A method according to claim 1, wherein the method includes, in the processing system, at least one of:
   a) selecting recipients from a list of available contactees;
   b) selecting recipients in accordance with a recipient type; and,
   c) selecting recipients by performing a search using recipient attributes.

3. A method according to claim 1, wherein the method includes, in the processing system:
   a) determining available communications mediums; and,
   b) for each recipient, selecting at least one of the available communications mediums.

4. A method according to claim 3, wherein the method includes, in the processing system:
   a) determining a priority associated with each medium; and,
   b) in accordance with the priorities, at least one of:
      i) transferring content; and,
      ii) selecting the at least one available communications medium.

5. A method according to claim 1, wherein the method includes, in the processing system, selecting a value for each recipient such that respective content is sent to each recipient.

6. A method according to claim 1, wherein the method includes, in the processing system:
   a) replacing the placeholder with sample values; and,
   b) selectively updating the sample values with alternative values in response to user inputs.

7. A method according to claim 1, wherein the method includes, in the processing system, transferring content by at least one of:
   a) transferring at least some content to at least one recipient device via a communications network;
   b) transferring at least some content to a base station, the base station being responsive to the content to cause the content to be provided to at least one recipient device via a communications network;
   c) transferring at least some of the content to a communications device, the communications device being responsive to the content to cause the content to be provided to at least one recipient; and,
   d) transferring at least some of the content to applications software, the applications software being responsive to the content to cause the content to be provided to at least one recipient.

8. A method according to claim 1, wherein the method includes, in the processing system, transferring content by displaying instructions for content transfer, an operator being responsive to the instructions to transfer the content.

9. A method according to claim 8, wherein the operator causes the content to be transferred via a telephone call.

10. A method according to claim 1, wherein the method includes, in the processing system:
    a) determining a status associated with content transfer; and,
    b) at least one of:
       i) storing an indication of the status; and,
       ii) displaying an indication of the status.

11. A method according to claim 1, wherein the content is a message, and wherein the communications mediums include at least one of:
   a) phone;
   b) fax;
   c) e-mail;
   d) letter;
   e) short message service (SMS);
   f) voice and video messaging;
   g) multi-media messaging (MMS); or
   h) Instant Messaging.

12. A method according to claim 1, wherein the method includes, in the processing system:
   a) for each of a number of recipients, selecting a plurality of available communications mediums; and,
   b) transferring content to each recipient using at least one of the selected available communications mediums.

13. A method according to claim 12, wherein the method includes, in the processing system:
   a) for each recipient, determining a priority associated with each selected available communication medium; and,
   b) transferring content to each recipient using the selected available communications mediums in accordance with the priorities.

14. A method according to claim 13, wherein the method includes, in the processing system:
   a) for each recipient, attempting to transfer content to the recipient using the selected available communications medium having the highest priority;
   b) in the event of a failed transmission, attempting to transfer content to the recipient using the selected available communications medium having the next highest priority; and,
   c) repeating step b) until the content is transferred.

15. A method according to claim 1, wherein the address is at least one of a postal address, an email address and a messaging address.

16. A method according to claim 1, wherein the contact number is at least one of a phone number and a fax number.

17. Apparatus for transferring content to a number of recipients via multiple independent communications mediums, the apparatus including a processing system for:
   a) causing a user interface to be displayed including a list of a plurality of recipients each being at least one of an individual, family, group and organization having associated contact details, the contact details including at least one of an address and a contact phone number;
   b) selecting the number of recipients from the list;
   c) selecting at least one communications medium for each of the number of recipients, the communications medium being selected based on the contact details of each of the number of recipients and wherein a plurality of different communications mediums are selected for at least one of the recipients;
   d) determining the content to be transferred by
      i) determining master content; and,
      ii) for each selected recipient modifying the master content, wherein the master content includes at least one placeholder, and wherein the method includes, in the processing system, replacing the placeholder with a value selected based on a recipient attribute to thereby generate respective content for each of the selected plurality of different communications mediums and each of the number of recipients so that the content is different for at least two of the selected plurality of different communications mediums and at least two of the selected recipients; and e) transferring the content to each of the number of recipients using the selected communications mediums.

18. Apparatus according to claim 17, wherein the apparatus includes, at least one of:
   a) a fax for sending fax messages;
   b) a phone for at least one of:
      i) sending SMS messages;
      ii) allowing phone calls to be made;
   c) a printer for printing messages.

19. Apparatus according to claim 17, wherein the processing system is connected to a communications network for allowing transfer of messages.

20. A method according to claim 1, wherein the method includes, in the processing system, displaying an indication of the content to be transferred using the interface.

21. A method according to claim 1, wherein the master content includes at least one placeholder, and wherein the method includes, in the processing system, replacing the placeholder with a value selected based on the communications medium to be used to send the content.

22. Apparatus according to claim 17, wherein the address is at least one of a postal address, an email address and a messaging address.

23. Apparatus according to claim 17, wherein the contact number is at least one of a phone number and a fax number.

24. A method of messaging to a number of recipients via multiple independent communications mediums, the method including, in a processing system:
   a) causing a user interface to be displayed including a list of a plurality of recipients each being at least one of an individual, family, group and organization having associated contact details the contact details including at least one of an address and a contact number;
   b) selecting the number of recipients from the list;
   c) selecting at least one communications medium for each of the number of recipients, the communications medium being selected based on the contact details of each of the number of recipients and wherein a plurality of different communications mediums are selected for at least one of the recipients;
   d) determining the message to be transferred by:
      i) determining a master message; and,
      ii) for each selected recipient modifying the master message, wherein the master message includes at least one placeholder, and wherein the method includes, in the processing system, replacing the placeholder with a value selected based on a recipient attribute to thereby generate respective messages for each of the selected plurality of different communications mediums and each of the number of recipients so that the content is different for at least two of the selected plurality of different communications mediums at least two of the selected recipients; and
   e) transferring the respective message to each of the number of recipients using the selected communications mediums.

25. A method according to claim 24, wherein the master content includes at least one placeholder, and wherein the method includes, in the processing system, replacing the placeholder with a value selected based on the communications medium to be used to send the content.

26. A method according to claim 24, wherein the address is at least one of a postal address, an email address and a messaging address.

27. A method according to claim 24, wherein the contact number is at least one of a phone number and a fax number.

* * * * *